US012688794B2

(12) United States Patent
Kim et al.

(10) Patent No.: US 12,688,794 B2
(45) Date of Patent: Jul. 21, 2026

(54) INFORMATION OUTPUT DEVICE AND METHOD

(71) Applicant: DOT INCORPORATION, Seoul (KR)

(72) Inventors: Ju Yoon Kim, Gimpo-si (KR); Ji Ho Kim, Gimpo-si (KR); Hyeon Cheol Park, Gwangmyeong-si (KR)

(73) Assignee: DOT INCORPORATION, Seoul (KR)

( * ) Notice: Subject to any disclaimer, the term of this patent is extended or adjusted under 35 U.S.C. 154(b) by 410 days.

(21) Appl. No.: 18/265,315

(22) PCT Filed: Jun. 22, 2021

(86) PCT No.: PCT/KR2021/007833
§ 371 (c)(1),
(2) Date: Jun. 5, 2023

(87) PCT Pub. No.: WO2022/139087
PCT Pub. Date: Jun. 30, 2022

(65) Prior Publication Data
US 2024/0054912 A1 Feb. 15, 2024

(30) Foreign Application Priority Data
Dec. 23, 2020 (KR) ........................ 10-2020-0182536

(51) Int. Cl.
*G09B 21/00* (2006.01)
*G06F 3/01* (2006.01)

(52) U.S. Cl.
CPC ........... *G09B 21/004* (2013.01); *G06F 3/016* (2013.01)

(58) Field of Classification Search
CPC ..... G09B 21/004; G09B 21/003; G06F 3/016; Y02E 60/10; G06Q 10/06; G08B 6/00

USPC ........................................................... 434/10
See application file for complete search history.

(56) References Cited

U.S. PATENT DOCUMENTS

2017/0160805 A1* 6/2017 Du ......................... G06F 1/3231
2020/0242969 A1 7/2020 Lubiner
2021/0090697 A1* 3/2021 Weiss .................. H04L 63/0861
(Continued)

FOREIGN PATENT DOCUMENTS

KR 10-2014-0049525 A 4/2014
KR 10-1541926 B1 8/2015
KR 10-1677215 B1 11/2016
(Continued)

OTHER PUBLICATIONS

International Search Report of PCT/KR2021/007833 dated Sep. 28, 2021 [PCT/ISA/210].

*Primary Examiner* — Pierre E Elisca
(74) *Attorney, Agent, or Firm* — Sughrue Mion, PLLC

(57) ABSTRACT

An information output device may include an information output part in which cells including a predetermined number of information output units formed to be tactilely sensed when upward movement or downward movement occurs in at least one direction are arranged in a lattice structure, a selection part selecting a plurality of cells to be driven according to information to be output to the information output part, a first generation part for generating a scheduling plan specifying a driving order for the plurality of cells selected by the selection part, and a second generation part generating a driving signal according to the scheduling plan and transmitting the driving signal to the cells.

18 Claims, 16 Drawing Sheets

(56)  References Cited

U.S. PATENT DOCUMENTS

| 2024/0054912 A1* | 2/2024 | Kim | G06Q 10/06 |
| 2025/0299600 A1* | 9/2025 | Kim | G06T 7/11 |

FOREIGN PATENT DOCUMENTS

| KR | 10-2017-0066029 A | 6/2017 |
| KR | 10-2017-0124982 A | 11/2017 |
| KR | 10-2018-0136716 A | 12/2018 |

* cited by examiner

INFORMATION OUTPUT DEVICE AND METHOD

FIELD

The present disclosure relates to an information output device and a method.

BACKGROUND

Users may perceive information in a variety of ways. For this purpose, various types of information output devices are being used. For example, a visual information output device using printed matter and an auditory information output device through sound are used.

In particular, with the increase in the amount of information and the development of technology, information output devices including electronic technology are widely used in modern times, and display devices having a plurality of pixels are commonly used as visual information output devices. However, in the case of these display devices, various circuits are embedded, reducing ease of manufacture and inconvenient control.

On the other hand, various types of information output forms are required due to technological development, diversification of lifestyle, and the like. For example, various information output devices may be required according to the situation of each user, and information output through tactile sense is required for users with weakened specific senses, for example, users with weak or no visual ability. In the case of information output through tactile sense, there are difficulties in controlling and driving, so there is a limit to improving user convenience through the improvement of information output devices.

The foregoing background art is technical information that the inventor possesses for derivation of the present disclosure or acquired in the process of deriving the present disclosure, and is not necessarily known technology disclosed to the general public prior to filing the present disclosure.

SUMMARY

One purpose of present disclosure is to provide more accurate information to a user by being able to display information with a tactile sense.

One purpose of present disclosure is to prevent malfunction of an information output device.

One purpose of the present disclosure is to optimize operating time of the information output device.

The problems that present disclosure seeks to solve are not limited to the problems mentioned above, other challenges and advantages of present disclosure that are not mentioned may be understood by the following description, and be more clearly understood by the embodiment of the present disclosure. In addition, it will be appreciated that the problems and advantages to be solved by the present disclosure may be realized by means and combinations thereof shown in the claims.

An information output device according to an embodiment of the present disclosure may include an information output part in which cells including a predetermined number of information output units formed to be tactilely sensed when upward movement or downward movement occurs in at least one direction are arranged in a lattice structure, a selection part selecting a plurality of cells to be driven according to information to be output to the information output part, a first generation part for generating a scheduling plan specifying a driving order for the plurality of cells selected by the selection part, and a second generation part generating a driving signal according to the scheduling plan and transmitting the driving signal to the cells.

An information output device according to another embodiment of present disclosure may include an information output part in which information output units formed to be tactilely sensed when upward movement or downward movement occurs in at least one direction are arranged, a selection part for selecting a plurality of information output units to be driven according to information to be output to the information output part, a first generation part generating a scheduling plan specifying a driving order for the plurality of information output units selected by the selection part, and a second generation part generating a driving signal according to the scheduling plan and transmitting the driving signal to the information output unit.

An information output method according to an embodiment of present disclosure may include selecting a plurality of cells to be driven according to information to be output to an information output part in which cells including a predetermined number of information output units formed to be tactilely sensed when upward movement or downward movement occurs in at least one direction are arranged in a lattice structure, by a selection part, generating a scheduling plan specifying a driving order for the plurality of cells selected by the selection part, by a first generation part, and generating a driving signal according to the scheduling plan and transmitting the driving signal to the cell, by a second generation part.

An information output method according to another embodiment of present disclosure may include selecting a plurality of information output units to be driven according to information to be output to an information output part among information output units formed to be tactilely sensed when upward movement or downward movement occurs in at least one direction, by a selection part, generating a scheduling plan specifying a driving order for the plurality of information output units selected by the selection part, by a first generation part, and generating a driving signal according to the scheduling plan and transmitting the driving signal to the information output unit, by a second generation part.

In addition to this, another method for implementing the present disclosure, another system, and a computer-readable recording medium storing a computer program for executing the method may be further provided.

Other aspects, features and advantages other than those described above will become apparent from the following drawings, claims and detailed description of the invention.

According to the present disclosure, a new driving algorithm for an information output device is implemented so that more accurate information may be provided to a user.

Also, since the new driving algorithm for the information output device is implemented, malfunction of the information output device may be prevented.

In addition, since the new driving algorithm for the information output device is implemented, operation time may be optimized and interference between cells may be minimized.

Effects of present disclosure are not limited to those mentioned above, and other effects not mentioned will be clearly understood by those skilled in the art from the description below.

DETAILED DESCRIPTION

Figure 1:
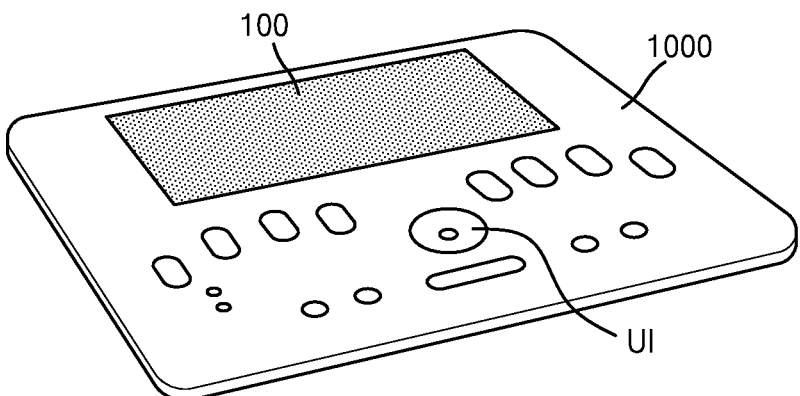
FIG. 1 is a diagram schematically illustrating an appearance of an information output device according to the present embodiment.

Advantages and characteristics of the present disclosure, and methods for achieving them will become clear with reference to the detailed description of the embodiments in conjunction with the accompanying drawings. However, it should be understood that the present disclosure is not limited to the embodiments presented below, and may be implemented in various different forms, and includes all transformations, equivalents, and substitutes included in the spirit and technical scope of the present disclosure. The embodiments presented below are provided to make the disclosure of the present disclosure complete, and to fully inform those skilled in the art of the scope of the invention to which the present disclosure belongs. In describing the present disclosure, if it is determined that a detailed description of a related known technology may obscure the gist of the present disclosure, the detailed description will be omitted.

Terms used in this application are only used to describe specific embodiments, and are not intended to limit the present disclosure. Singular expressions include plural expressions unless the context clearly dictates otherwise. In this application, the terms "include" or "have" are intended to designate that there is a feature, number, step, operation, component, part, or combination thereof described in the specification, but one or more other features. It should be understood that the presence or addition of numbers, steps, operations, components, parts, or combinations thereof is not precluded. Terms such as first and second may be used to describe various components, but components should not be limited by the terms. These terms are only used for the purpose of distinguishing one component from another.

Hereinafter, embodiments according to present disclosure will be described in detail with reference to the accompanying drawings, and in the description with reference to the accompanying drawings, the same or corresponding components are assigned the same reference numerals, and duplicate descriptions thereof will be omitted.

FIG. 1 is a diagram schematically illustrating an appearance of an information output device according to the present embodiment. Referring to FIG. 1, an information output device 1000 may include an information output part 100 and a plurality of user interfaces UI.

The information output part 100 is composed of a plurality of information output units 300 (See FIGS. 2 and 3), and may output predetermined information (e.g., image, text, image and text) in braille form.

The plurality of user interfaces UI may include a manipulation part for manipulating the information output device 1000. This manipulation part may be composed of a sensor, button, or switch structure capable of recognizing a user's touch or press manipulation. In this embodiment, the manipulation part may transmit manipulation signals manipulated by the user to check or change various types of information related to driving of the information output unit 300 included in the information output part 100 to a control part 900 (see FIG. 6).

Figure 2:
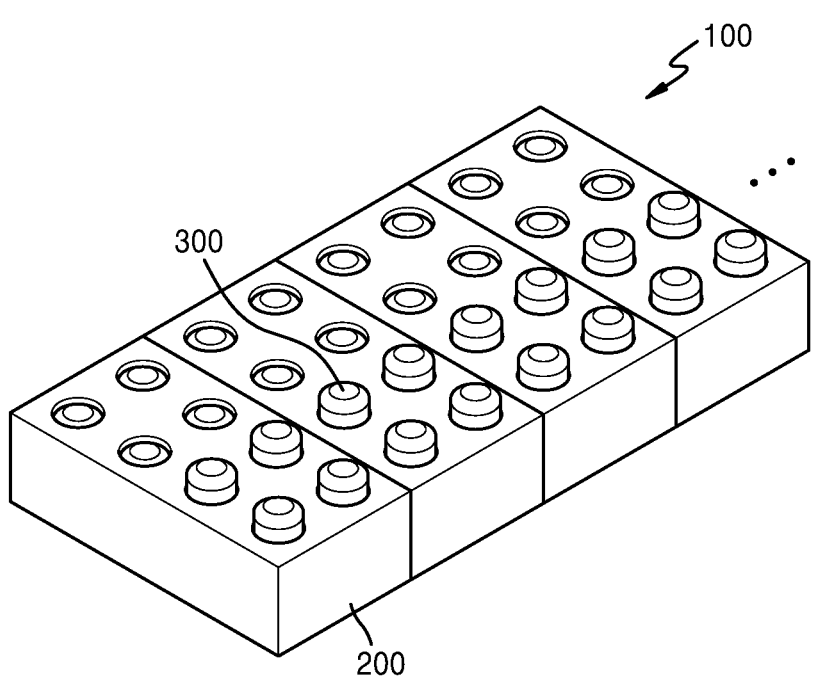
FIG. 2 is a diagram for explaining an operation of an information output cell included in an information output part in FIG. 1.

FIG. 2 is a diagram for explaining an operation of an information output cell included in an information output part in FIG. 1. In the following description, descriptions of overlapping portions with those of FIG. 1 will be omitted. Referring to FIG. 2, the information output part 100 may include a plurality of information output cells 200 (200_1 to 200_N). As an example, the information output part 100 may include a total of 300 information output cells 200 corresponding to 30×10, but is not limited thereto and may include 300 or more information output cells 200.

The braille information output to the information output part 100 may be output in units of information output cells 200 including information output units 300 arranged in 4 rows and 2 columns, and in this embodiment, each of the information output cells 200 may include 8 information output units 300.

One information output cell 200 includes 8 information output units 300 in this embodiment, but is not limited thereto, and one information output cell 200 may include 2 or more and less than 8 information output units 300, may include more information output units 300 in some cases.

Figure 3:
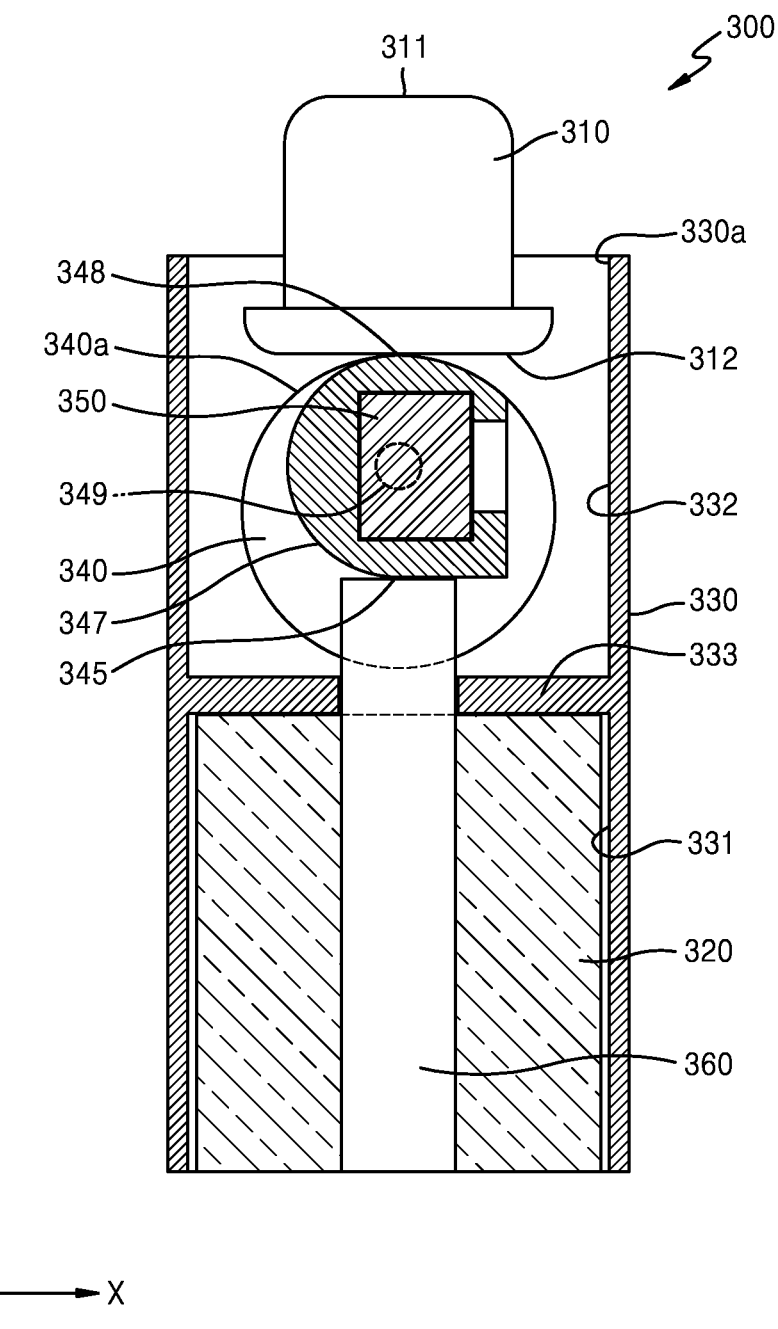
FIGS. 3 to 5 are diagrams for explaining operation of an information output unit included in the information output cell of FIG. 2.
Figure 4:
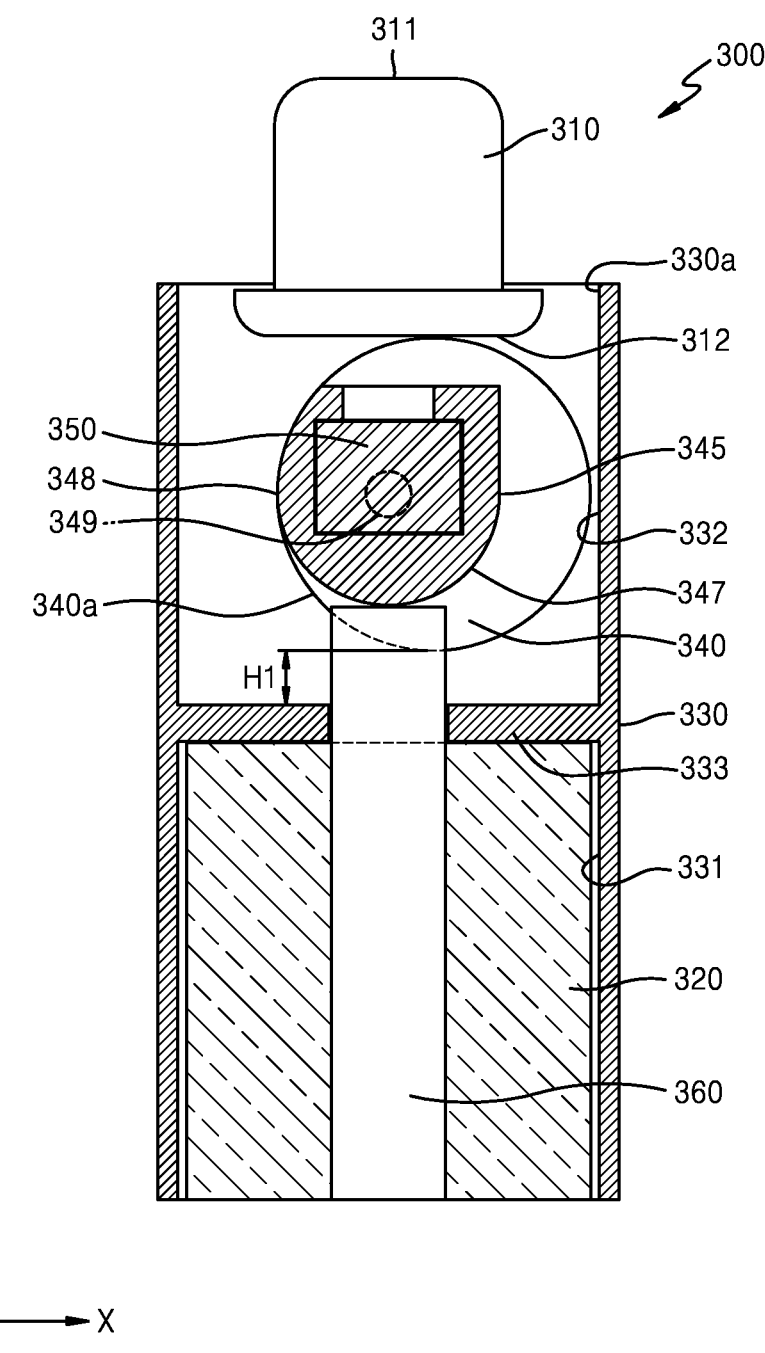
Figure 5:
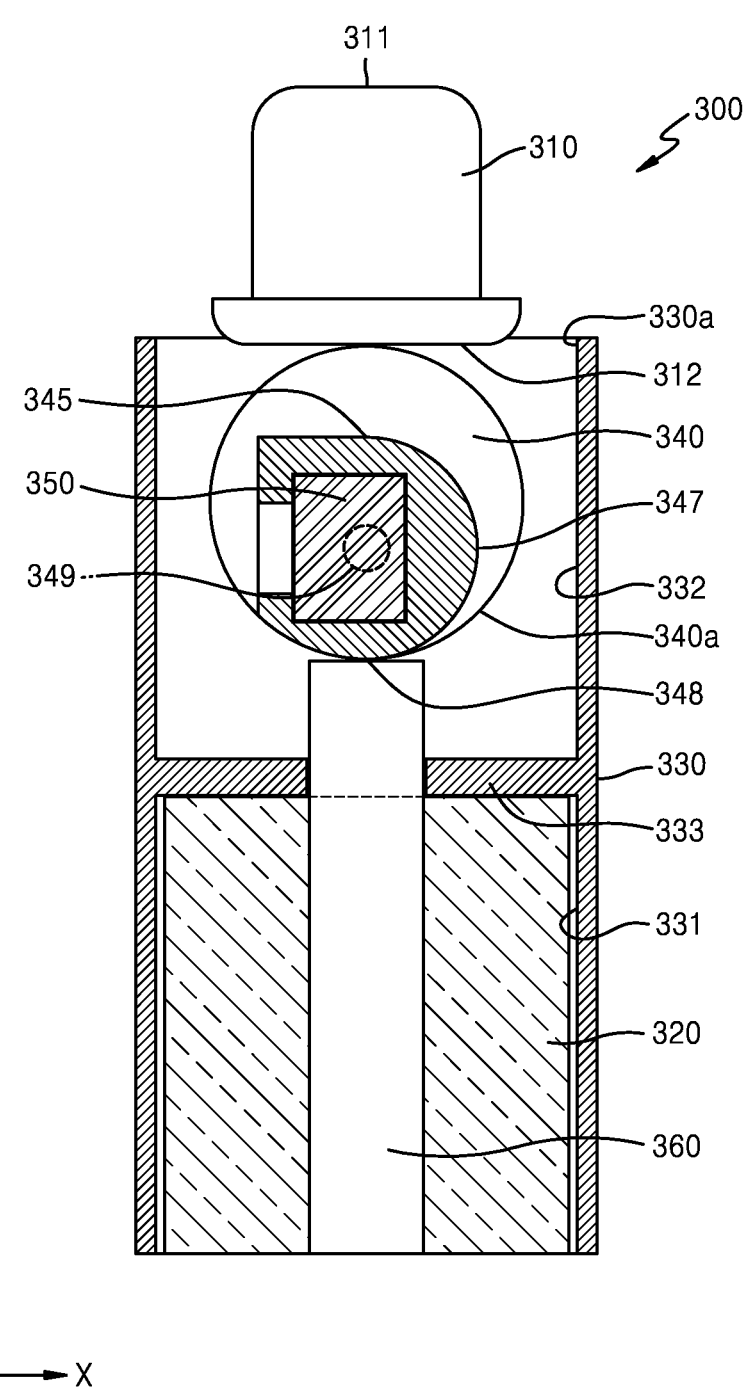

FIGS. 3 to 5 are diagrams for explaining operation of an information output unit included in the information output cell of FIG. 2. In the following description, descriptions of portions overlapping those of FIGS. 1 and 2 will be omitted. Referring to FIGS. 3 to 5, the information output part 100 of this embodiment includes at least one information output cell 200, and the information output cell 200 may include a plurality of (e.g., 8 pieces of 4 rows and 2 columns) information output unit 300.

The information output unit 300 may include a coil portion 320, a base portion 330, a driving portion 340 and an expression member 310.

As will be described later, the expression member 310 may move according to the movement of the driving portion 340, and may move upward and downward based on at least a length direction of the expression member 310. For example, the expression member may move in one direction toward the coil portion and in the opposite direction.

Through this, the expression member 310 may move to protrude in one direction, and the user may sense the movement of the expression member 310 tactilely or visually.

The expression member 310 may include an expression surface 311 and a support surface 312.

The support surface 312 is a surface of the expression member 310 facing the driving portion 340, forms a lower area of the expression member 310, and may contact the driving portion 340, and the driving portion 340 may transmit power to the expression member 310 through the support surface 312. For example, a driving surface 340*a* of the driving portion 340 may contact the support surface 312 and move the support surface 312 in a first direction, that is, in a Z-axis direction of FIG. 5.

The expression surface 311 may include an area recognized by the user as an outermost area of areas of the expression member 310, e.g., a farthest area from the coil portion.

For example, the entire region of the expression member 310 may be recognized by the user, but only the expression surface 311 may be recognized. For example, the user may detect the movement of the expression member 310 through contact with the expression surface 311, and the user may easily detect the movement of the expression member 310 through visual detection of the expression surface 311.

As an optional embodiment, the expression surface 311 may include a curved surface.

The expression member 310 may have various shapes, and may include a pillar-shaped region, for example, a column-shaped region.

Also, as an optional embodiment, a protruding region of the expression member 310 may have the curved surface, and a corner may have the curved surface.

The expression member 310 may include various materials, and may be formed of an insulating material as a light and durable material. For example, the expression member may contain a resin-based organic material. As another example, the expression member may include an inorganic material such as a ceramic material.

Also, as another optional embodiment, the expression member 310 may be formed of a material such as metal or glass.

The coil portion may be formed to be connected to an external power source (not illustrated). When current flows through the coil portion, a magnetic field may be formed around the coil portion.

The coil portion may have various shapes, and for example, the coil portion may have a shape in which multiple circuit wires are wound, and a number of times of winding may be variously controlled.

The driving portion 340 may move through the magnetic field generated by the current flowing through the coil portion, and driving force required for the movement of the expression member 310 may be provided through this movement of the driving portion 340.

As an optional embodiment, a support portion 360 may be further disposed, and at least one region of the support portion 360 may be disposed to be adjacent to or support the coil portion 320.

For example, the support portion 360 may include an elongated region and may be disposed to pass through the coil portion 320, and as a specific example, a plurality of coils of the coil portion 320 may have a wound shape around the support portion 360.

As an optional embodiment, one end of the support portion 360 may be extended to support the driving portion 340 to be described later, and the movement of the driving portion 340 may proceed while being supported by one end of the support portion 360.

As an optional embodiment, the support portion 360 may be formed to correspond to a through portion 330H of the base portion 330.

As an optional embodiment, the support portion 360 may include a magnetic material, and as a specific example, an extension member 361 may contain the magnetic material. Through this, when the magnetic field is generated through the coil portion 320, size of the magnetic field may be increased, and power consumption of the information output part 100 may be reduced by efficiently generating the magnetic field.

The base portion 330 may be formed to accommodate the coil portion 320. For example, the base portion 330 may include a first accommodating portion 331 and a second accommodating portion 332.

The first accommodating portion 331 and the second accommodating portion 332 may be disposed to be adjacent to each other and may be disposed not to overlap each other.

As an optional embodiment, the first accommodating portion 331 and the second accommodating portion 332 may be separated from each other.

As another optional embodiment, the first accommodating portion 331 and the second accommodating portion 332 may be connected through a through hole.

The coil portion 320 may be disposed on the first accommodating portion 331. As an optional embodiment, the above-described support portion 360 may be disposed on the first accommodating portion 331, and one region of the support portion 360 may be extended to the second accommodating portion 332 through the through hole.

Although not illustrated, as an optional embodiment, a driving groove (not illustrated) may be formed in the second accommodating portion 332 of the base portion 330. For example, the driving groove (not illustrated) may be formed on both sides of an inner surface of the second accommodating portion 332 of the base portion 330 facing each other, and as an optional embodiment, may have a form extended in one direction, for example, a direction away from the coil portion 320.

The base portion 330 may have an elongated shape to accommodate the coil portion 320 and the driving portion 340, and may be formed to entirely surround both the coil portion 320 and the driving portion 340.

As an optional embodiment, the base portion 330 may include a boundary portion 333 between the first accommodating portion 331 and the second accommodating portion 332.

The first accommodating portion 331 and the second accommodating portion 332 may be separated through the boundary portion 333.

As an optional embodiment, the through hole may be formed in the boundary portion 333 so that one region of the support portion 360 extends and passes therethrough.

In addition, the base portion 330 may include an inlet portion 330a, and the inlet portion 330a may be connected to the second accommodating portion 332. Through the inlet portion 330a, the expression member 310 may move so that a length protruding to the outside of the base portion 330 changes.

The driving portion 340 may be disposed on the base portion 330. The driving portion 340 may be disposed on the second accommodating portion 332 and may be spaced apart from the coil portion 320 disposed on the first accommodating portion 331.

The driving portion 340 is disposed adjacent to the coil portion 320 and is driven by the current flowing through the coil portion 320 to perform angular or rotational motion. Through the driving portion 340, the expression member 310 may move up and down, for example, in one direction toward the coil portion and in the opposite direction.

As an optional embodiment, a magnetic force portion 350 may be disposed in the driving portion 340, for example, in an inner space. For example, the magnetic force portion 350 may contain a magnetic material, and may include, for example, a permanent magnet.

The magnetic force portion 350 may have a first region (e.g., N pole or S pole) and a second region (e.g., S pole or N pole) having polarities different from each other, and the first region and the second region having polarities different from each other may be arranged in a direction, for example, in the Z-axis direction from the coil portion 320 toward the expression member 310 at one point during rotation of the driving portion 340.

For example, with reference to FIG. 5, the first region and the second region having polarities different from each other of the magnetic force portion 350 may be arranged in the direction, for example, in the Z-axis direction from the coil portion 320 toward the expression member 310.

The driving portion 340 includes the driving surface 340*a* on at least an outer surface, and the driving surface 340*a* is formed to support the expression member 310 to provide the driving force for vertical movement of the expression member 310.

As an optional embodiment, the driving surface 340*a* of the driving portion 340 may include a curved surface as an outer surface. As a more specific embodiment, the driving surface 340*a* of the driving portion 340 may include a boundary line similar to a circle.

The driving portion 340 may include a driving control portion 349.

A driving position of the driving portion 340 may be controlled through the driving control portion 349. For example, when the driving portion 340 moves by the coil portion 320, it may perform angular movement or rotational movement around the driving control portion 349.

As an optional embodiment, a central axis of the driving portion 340 and the driving control portion 349 may not coincide and may be eccentric.

In addition, as an optional embodiment, the magnetic force portion 350 may not coincide with the central axis of the driving portion 340 and, for example, may be disposed to overlap one region of the driving control portion 349.

Through this, torque force for the driving portion 340 may be easily generated, and the driving portion 340 may perform angular or rotational movement so that the movement for the expression member 310 may be efficiently performed and a precise expression of the information output part 100 may be improved. Also, power consumption of the information output part 100 may be reduced.

Although not illustrated, the driving portion 340 may include a first driving member (not illustrated) and a second driving member (not illustrated), and may include a separation space (not illustrated) therebetween.

Each of outer surfaces of the first driving member (not illustrated) and the second driving member (not illustrated) may include the driving surface 340*a* on at least one surface to support the expression member 310 during movement of the driving portion 340 and apply the driving force to the expression member 310. For example, an outer boundary line (for example, a circle) of the driving portion 340 including the driving surface 340*a* illustrated in FIG. 5 may be a boundary line of the first driving member (not illustrated) or the second driving member (not illustrated).

As an optional embodiment, each of the outer surfaces of the first driving member (not illustrated) and the second driving member (not illustrated) may include a curved surface, and for example, the driving surface 340*a* may include a curved surface.

For example, each of the first driving member (not illustrated) and the second driving member (not illustrated) may have a shape similar to a rotating body, or may have a shape similar to a disk.

Through this, a natural driving force is provided to the support surface 312 of the expression member 310 during rotation or angular movement of the first driving member (not illustrated) and the second driving member (not illustrated) so that the expression member 310 may efficiently proceed with continuous and natural movement.

The driving control portion 349 may be disposed on at least one side, for example, on both sides of the driving portion 340.

As an optional embodiment, the driving control portion 349 may have a protruding shape protruding in a direction away from the side of the driving portion 340 (a direction protruding from the drawing of FIG. 5), and as an optional embodiment, the protruding shape of the driving control portion 349 may correspond to the driving groove (not illustrated) when the base portion 330 includes the driving groove (not illustrated).

For example, the driving portion 340 may move by the magnetic field generated by the coil portion 320, and as a specific example, may move up and down due to a repulsive force and an attractive force applied to the magnetic force portion 350 within the driving portion 340. At this time, the driving portion 340 may move up and down while performing the rotational motion around the driving control portion 349.

As an optional embodiment, the driving portion 340 may move while the driving control portion 349 of the driving portion 340 is disposed in one region of the base portion 330, for example, the driving groove (not illustrated) of the second accommodating portion 332.

A first movement area 345 and a second movement area 348 may be disposed in the separation space between the first driving member (not illustrated) and the second driving member (not illustrated).

The first movement area 345 and the second movement area 348 may be areas serving as reference points for a lowest point and a highest point during the movement of the driving portion 340, respectively.

As an optional embodiment, a connection area 347 may be disposed between the first movement area 345 and the second movement area 348, and the connection area 347 may include a curved surface.

For example, as illustrated in FIG. 5, when the first movement area 345 is disposed in a lowest portion, that is, an area closest to the coil portion 320, the driving portion 340 is placed at the lowest point, and thus the expression member 310 may also be placed at the lowest point, in detail, a height at which the expression member 310 protrudes from the base portion 330 may be the smallest. At this time, the first movement area 345 may be supported by an upper end of the support portion 360.

Then, as illustrated in FIG. 4, the driving portion 340 may move when current is applied to the coil portion 320 to form the magnetic field, for example, the connection area 347 may be supported by the upper end of the support portion 360 while one end of the magnetic force portion 350 (the polar side where the repulsive force acts) is disposed away from the direction of the magnetic field when the repulsive force acts on the magnetic force portion 350 disposed on the driving portion 340. Referring to FIG. 4, the driving portion 340, that is, a top surface of the driving portion 340 rises, and accordingly, the expression member 310 may also slightly rise by the height of H1 with reference to FIG. 4.

As an optional embodiment, since the driving portion 340 rotates around the driving control portion 349, the driving control portion 349 may maintain its position.

Then, as illustrated in FIG. 5, when current is applied to the coil portion 320 of FIG. 4 and the state in which the magnetic field is formed is maintained, the driving portion 340 may continuously move, for example, one end of the magnetic force portion 350 in which the attractive force acts according to the generated magnetic field among the areas of the magnetic force portion 350 disposed on the driving portion 340 may arranged close to the coil portion 320, the second movement area 348 may be supported by the upper end of the support portion 360. Referring to FIG. 5, the driving portion 340, that is, the top surface of the driving portion 340 rises, and accordingly, the expression member 310 may also rise, and the state of FIG. 5 may become a highest peak of the expression member 310.

As an optional embodiment, since the driving portion 340 rotates around the driving control portion 349, the driving control portion 349 may maintain its position.

As an alternative embodiment, the movement from the state of FIG. 5 to the state of FIG. 5 may be continuous. The state of FIG. 4 is for explaining one process, and when the state of FIG. 5 is changed to the state of FIG. 4, the driving portion 340 and the expression member 310 continue to move without stopping in the state of FIG. 4, and the state of FIG. 5 may be reached.

For example, FIGS. 3 and 5 may illustrate a state in which the expression member 310 may maintain a stationary state, and FIG. 4 may illustrate a state in which the expression member 310 is in motion.

As an optional embodiment, the sequential movement process of FIGS. 5 to 5 may also be applied to embodiments to be described later.

During the rotational movement of the driving portion 340, the support portion 360 may support the first movement area 345 and support at least one area of the connection area 347 before supporting the second movement area 348, and through this, the driving portion 340 naturally moves, and the movement of the expression member 310 may also be precisely controlled.

A distance between the driving surface 340a and the first movement area 345 may be different from a distance between the driving surface 340a and the second movement area 348. For example, the distance between the driving surface 340a and the first movement area 345 may be greater than the distance between the driving surface 340a and the second movement area 348.

As an optional embodiment, a distance between a shape-wise central axis of the driving portion 340 and the first movement area 345 may be smaller than a distance between the shape-wise central axis of the driving portion 340 and the second movement area 348.

As an optional embodiment, a distance between the driving control portion 349 and the first movement area 345 may be the same as or similar to a distance between the driving control portion 349 and the second movement area 348, and as a further optional embodiment, may be the same as or similar to a distance between the driving control portion 349 and the connection area 347.

For example, the connection area 347 may correspond to at least one area of a circumference having a radius centered with respect to a center point of the driving control portion 349, and each of the first movement area 345 and the second movement area may have a form of a flat surface extending parallel to each other in areas facing each other corresponding to diameters.

Through this, when the driving portion 340 rotates around the driving control portion 349 and the support portion 360 supports the first movement area 345, the second movement area 348 and the connection area 347, the driving control portion 349 may maintain the same or similar position.

In addition, when supported by the support portion 360, the connection area 347 supported by the support portion 360 includes the curved surface or a surface close to an arc, so that the driving portion 340 may move smoothly and efficiently.

Although not illustrated, the second accommodating portion 332 of the base portion 330 may include a groove at least larger than the driving control portion 349 to accommodate the driving control portion 349.

The foregoing describes a case in which the first movement area 345, the second movement area 348 and the connection area 347 are disposed in the separation space between regions including the driving surface 340a of the driving portion 340, for example, the first driving member (not illustrated) and the second driving member (not illustrated). In addition, this is the same in the embodiments described later.

As another optional embodiment, the first movement area 345, the second movement area 348, and the connection area 347 may be disposed on an outer surface of the region including the driving surface 340a of the driving portion 340, for example, the first driving member (not illustrated) or the second driving member (not illustrated).

In addition, as another optional embodiment, there is one region including the driving surface 340a of the driving portion 340, for example, the first driving member (not illustrated) or the second driving member (not illustrated), and the first movement area 345, the second movement area 348 and the connection area 347 may be disposed on both sides, and accordingly, the driving control portion 349 may be disposed in an area forming the first movement area 345, the second movement area 348 and the connection area 347.

In addition, these various optional embodiments, that is, the structure having the first movement area 345, the second movement area 348 and the connection area 347 on an outer surface having a smaller size than the region including the driving surface 340a, for example, the first driving member (not illustrated) or the second driving member (not illustrated) may be modified in various ways.

In this embodiment, the driving portion 340 of the information output unit 300 may move in at least the first direction or in the opposite direction, and the expression member may also move in the first direction or in the opposite direction according to the motion of the driving portion 340 so that a variety of information which the user may detect may be output.

For example, the information output unit 300 of this embodiment may be an information output device that allow the user to sense the surface of the expression member through a tactile sense when the expression member 310 protrudes. More specifically, for example, it may be information output in a form of braille output.

As an optional embodiment, the information output unit 300 may be a visual sensing type of information output that allow the user to sense the protrusion of the expression member 310 through a visual sense. In particular, if a color is formed on one surface, for example, the upper surface of the expression member 310, or light is generated on one surface of the expression member, this visual effect may be enhanced.

Through this, the information output unit 300 of this embodiment may output information to the user.

In addition, in detail, the driving portion 340 may easily move, for example, rise in the first direction by the magnetic field of the coil portion 320 and rotate while maintaining a certain area by the driving control portion 349.

For example, when the repulsive force is generated by the magnetic field generated in the coil portion 320 according to the polarity of the magnetic force portion 350 disposed inside the driving portion 340, the driving portion 340 may perform the upward movement while rotating.

Through this, the raising and lowering of the driving portion 340 is performed with a smooth, natural and precise movement, and accordingly, irregular interruptions during the raising and lowering of the expression member 310 may be reduced and control of flexible movement and precise movement may be facilitated.

An on or off state of the information output device 1000 may be easily implemented by raising and lowering the expression member 310.

In addition, even if the force applied to the driving portion 340 is removed through the support, for example, support for the first movement area and the second movement area through the support portion during the lifting and lowering operations of the driving portion 340, the state may be maintained.

That is, after rising from a state in which the first movement area is supported by an extended portion of the driving portion 340 to a state in which the second movement area is supported by the extended portion by the magnetic field of the coil portion 320, even if power connected to the coil portion 320 or current or voltage is removed, the driving portion 340 may maintain the state in which the second movement area is supported by the extended portion.

In addition, after descending from the state in which second movement area is supported by the extended portion to the state in which the first movement area is supported by an extended portion by the magnetic field in the opposite direction through the coil portion 320, even if power connected to the coil portion 320 or current or voltage is removed, the driving portion 340 may maintain the state in which the first movement area is supported by an extended portion.

Through this, the on and off states of the expression member 310 of the information output unit 300 may be easily switched and maintained, power consumption for the movement of the expression member 310 may be reduced, and overall energy efficiency of the information output device 1000 may be improved.

In addition, the driving control portion 349 provided in the driving portion 340 of the present embodiment is eccentric from the central axis of the driving portion 340, and through this, torque is easily generated in the driving portion 340 to implement the rise and descent through the rotation movement of the driving portion 340, so that the precise, smooth and natural motion control for the expression member may be performed.

As an optional embodiment, the magnetic force portion 350 included in the driving portion 340 may be disposed to overlap the driving control portion 349, and for example, the center of the magnetic force portion 350 and the driving control portion 349 may overlap.

Through this, when the driving portion 340 rotates with respect to the driving control portion 349, a change in the position of the magnetic force portion 350 may be reduced, for example, a distance between the coil portion 320 and the magnetic force portion 350 may be maintained the same or similar. As a result, non-uniformity of the effect of the magnetic field through the coil portion 320 on the magnetic force portion 350 may be reduced, and precise control of the motion of the driving portion 340 may be facilitated.

In this embodiment, the coil portion 320, the base portion 330, the driving portion 340, the magnetic force portion 350 and the support portion 360 excluding the expression member 310 of the information output unit 300 may be referred to as an actuator 370.

The actuator 370 may protrude or sink the expression member 310 by moving it in at least one direction by a driving signal generated in a second generation part 830 (see FIG. 9) described later. Here, the driving signal may be in a pulse wave form, and a driving signal in a + pulse wave form may be transmitted to the actuator 370 to cause the expression member 310 to move upward, and a driving signal in a − pulse wave form. may be transmitted to the actuator 370 to cause the expression member 310 to move downward.

In this embodiment, the braille information output to the information output part 100 may be driven by units of information output cells 200. In order for the information output cell 200 to output braille information, a driving signal may be simultaneously transmitted to 8 actuators 370 each driving 8 information output units 300.

Since the units of information output cells 200 are driven as described above, malfunctions may occur in the information output cells 200 due to electromagnetic interference. Here, the malfunction may include a case where the information output unit 300 which is to be protruded (raised) in the information output cell 200 maintains a recessed (lowered) position, or a case where the information output unit 300 which is to be recessed (lowered) maintains a protruded (raised) position.

In addition, the malfunction may include a case where the expression member 310 which is to be protruded (raised) maintains a recessed (lowered) position, or a case where the expression member 310 which is to be recessed (lowered) maintains a protruded (raised) position, by a residual current of the pulse wave applied to the actuator 370 as the driving signal.

Further, the malfunction may include a case where the expression member 310 which is to be protruded (raised) maintains a recessed (lowered) position, or a case where the expression member 310 which is to be recessed (lowered) maintains a protruded (raised) position, by magnetization of the coil portion 320 included in the actuator 370.

Therefore, in this embodiment, in order to prevent malfunction of the information output part 100, a new driving algorithm for driving the information output part 100 may be proposed to optimize driving time and minimize interference between cells.

Figure 6:
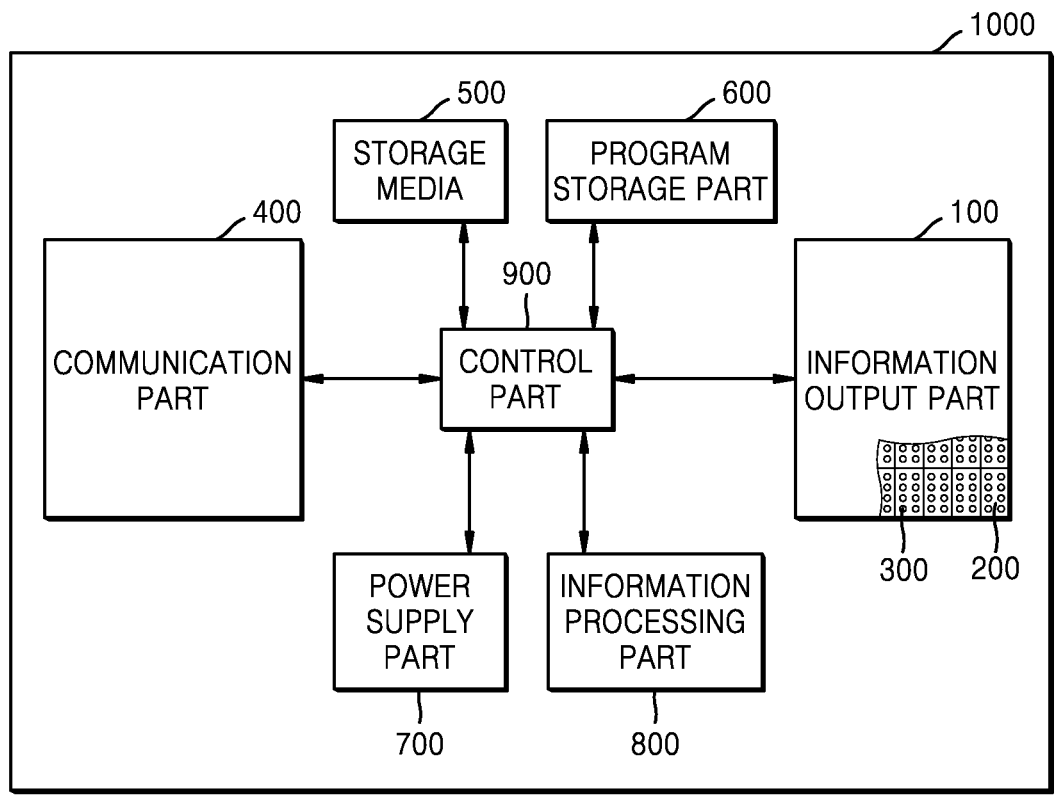
FIG. 6 is a diagram schematically illustrating configuration of the information output device of FIG. 1.
Figure 7:
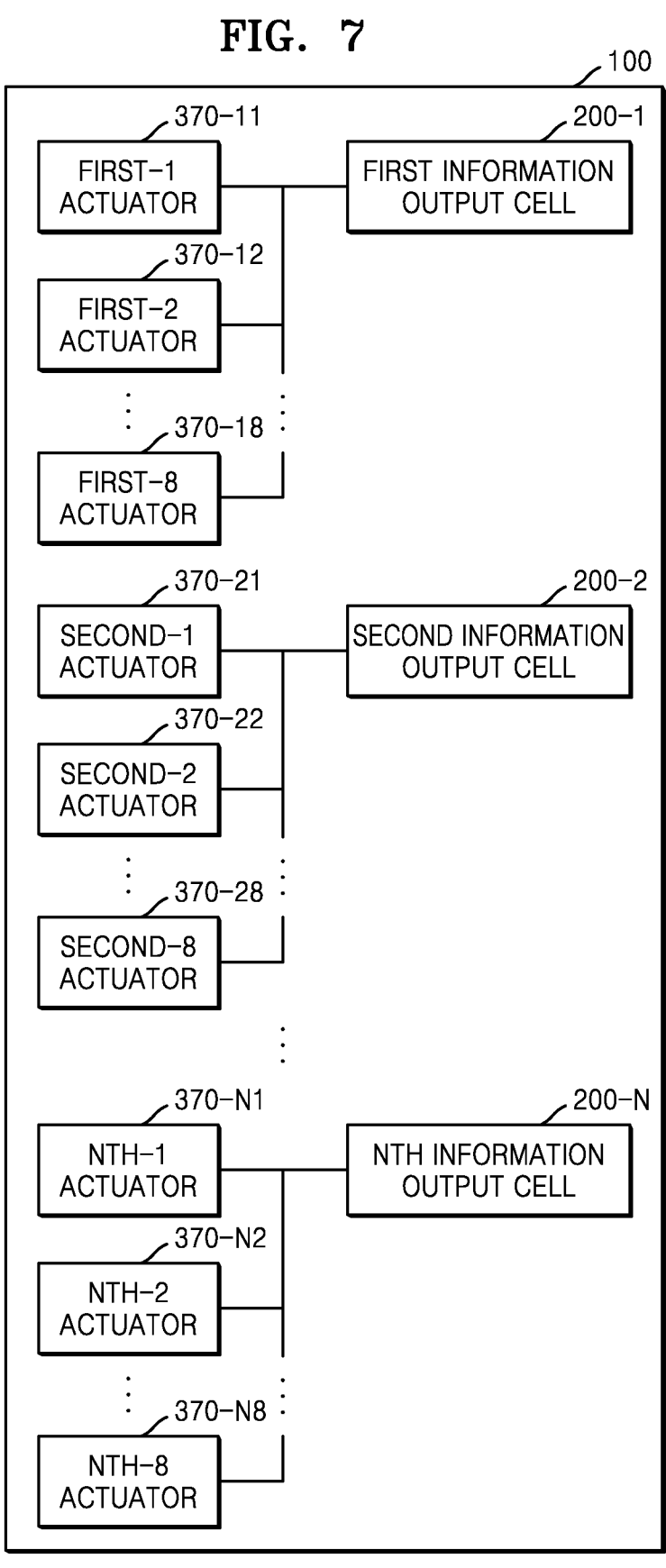
FIGS. 7 and 8 are diagrams for schematically explaining configuration of an information output part in FIG. 6.
Figure 8:
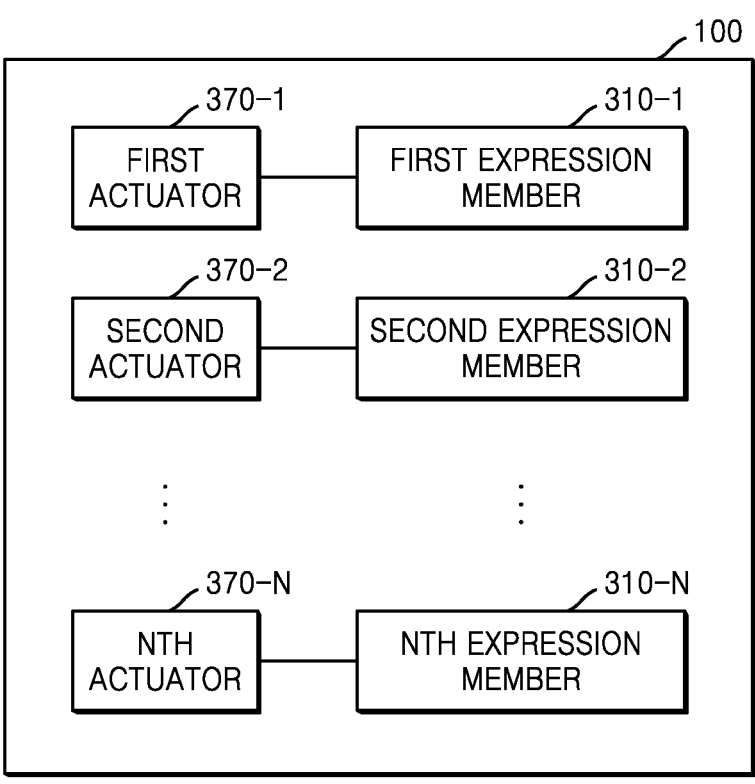

FIG. 6 is a diagram schematically illustrating configuration of the information output device of FIG. 1, and FIGS. 7 and 8 are diagrams for schematically explaining configuration of an information output part in FIG. 6. In the following description, descriptions of portions overlapping those of FIGS. 1 to 5 will be omitted.

Referring to FIGS. 6 to 8, the information output device 1000 may include the information output part 100 including the information output cell 200 and the information output unit 300, the information output unit 300, a communication part 400, a storage media 500, a program storage part 600, a power supply part 700, an information processing part 800 and a control part 900.

Also, in this embodiment, "part" may be a hardware component such as a processor or a circuit, and/or a software component executed by the hardware component such as the processor.

The information output part 100 drives the information output unit 300 included in the information output cell 200 to ascend or descend based on the driving signal according to the scheduling plan transmitted from the information processing part 800 so that the user may sense it by touch.

FIG. 7 is a diagram schematically illustrating a configuration of the information output part 100 according to an embodiment, and illustrates an example of driving braille information to be output to the information output part 100 by units of information output cells 200.

Referring to FIG. 7, the information output part 100 may include N information output cells 200, and each of the information output cells may include 8 actuators 370.

Referring to FIG. 7, a first-1 actuator 370-11 to a first-8 actuator 370-18 are connected to a first information output cell 200-1, and in a case of driving the first information output cell 200-1, 8 driving signals may be simultaneously applied to each of the first-1 actuator 370-11 to the first-8 actuator 370-18. Here, the 8 driving signals may be one of + pulse voltage and − pulse voltage.

Referring to FIG. 7, a second-1 actuator 370-21 to a second-8 actuator 370-28 are connected to a second information output cell 200-2, in a case of driving the second information output cell 200-2, 8 driving signals may be simultaneously applied to each of the second-1 actuator 370-21 to the second-8 actuator 370-28. Here, the 8 driving signals may be one of + pulse voltage and − pulse voltage.

FIG. 8 is a diagram schematically illustrating a configuration of an information output part 100 according to another embodiment. Referring to FIG. 8, an example of driving braille information to be output to an information output part 100 in units of information output units 300 is illustrated.

Referring to FIG. 8, the information output part 100 may include N information output units 300 including N expression members 310 and N actuators 370.

Referring to FIG. 8, a first actuator 370-1 may be connected to a first expression member 310-1, a second actuator 370-2 may be connected to a second expression member 310-2, and an Nth actuator 370-N may be connected to an Nth expression member 310-N.

Therefore, a driving signal may be applied to the first actuator 370-1 when trying to move the first expression member 310-1 upward or downward, a driving signal may be applied to the second actuator 370-2 when trying to move the second expression member 310-2 upward or downward, and a driving signal may be applied to the Nth actuator 370-1 when trying to move the Nth expression member 310-N upward or downward.

Returning to FIG. 6, the communication part 400 is provided to communicate with a network (not illustrated) to transmit and receive signals between an external device (e.g., an information providing system, server, or other information output device, not illustrated) and the information output device 1000, and may provide a communication interface necessary to provide transmission and reception signals in a form of packet data. Furthermore, the communication part 400 may serve to receive a predetermined information request signal from the information output device 1000 and transmit information processed by the information output device 1000 to an outside. Here, the network is a medium that serves to connect the external device and the information output device 1000, and may include a path providing an access path so that the information output device 1000 may transmit and receive data after accessing the external device.

In this embodiment, the network may be, for example, a wired networks such as local area networks (LANs), wide area networks (WANs), metropolitan area networks (MANs), integrated service digital networks (ISDNs) or a wireless networks such as wireless LANs, CDMA, Bluetooth, and satellite communications, but the scope of the present disclosure is not limited thereto. In addition, the network may transmit and receive information using short-distance communication and/or long-distance communication. Here, the short-distance communication may include Bluetooth, radio frequency identification (RFID), infrared data association (IrDA), ultra-wideband (UWB), ZigBee, and wireless fidelity (Wi-Fi) technologies, and the long-distance communication may include code division multiple access (CDMA), frequency division multiple access (FDMA), time division multiple access (TDMA), orthogonal frequency division multiple access (OFDMA), single carrier frequency division multiple access (SC-FDMA) technologies.

The network may include connections of network elements such as hubs, bridges, routers and switches. A network may include one or more connected networks, such as a multi-network environment, including a public network such as an Internet and a private network such as a secure enterprise private network. Access to the network may be provided through one or more wired or wireless access networks. Furthermore, the network may support an Internet of Things (IoT) network and/or 5G communication that exchanges and processes information between distributed components such as things.

The storage media 500 may temporarily or permanently store information processed by the control part 900 and/or information received from the outside through the communication part 400. Here, the storage media 500 may include a magnetic storage media or a flash storage media, but the scope of present disclosure is not limited thereto. The storage media 500 may include built-in memory and/or external memory, and may include volatile memory such as DRAM, SRAM, or SDRAM, non-volatile memory such as one time programmable ROM (OTPROM), PROM, EPROM, EEPROM, mask ROM, flash ROM, NAND flash memory, or NOR flash memory, a flash drive such as an SSD, compact flash (CF) card, SD card, Micro-SD card, Mini-SD card, Xd card, or memory stick, or a storage device such as an HDD.

The program storage part 600 may be equipped with control software that performs an operation of selecting a plurality of information output cells to be driven according to information to be output to the information output part 100, an operation of generating a scheduling plan specifying a driving order for the selected plurality of information output cells, an operation of generating a driving signal according to the scheduling plan and transmitting it to the information output cell, an operation of determining a power supply operation mode of the information output device 1000, an operation of determining an information output mode according to type of information to be output to information output part 100, an operation of converting information on the information output mode into braille information and outputting the result of braille information conversion, an operation of selecting a plurality of information output units to be driven according to information to be output to the information output part 100, an operation of generating a scheduling plan specifying a driving order for the selected plurality of information output units, an operation of generating a driving signal according to the scheduling plan and transmitting it to the information output unit, and the like.

The power supply part 700 may supply power to each component of the information output device 1000 by receiving external power source and internal power source under the control of the control part 900. The power supply part 700 may operate in a first power mode in which the information output device 1000 is operated by AC power. In addition, the power supply part 700 may operate in a second power mode in which the information output device 1000 is operated by DC power from the battery.

Here, the battery may be composed of a built-in battery or a replaceable battery. The battery may be charged by a wired or wireless charging method, and the wireless charging method may include a magnetic induction method or a magnetic resonance method. In this embodiment, the battery may include a rechargeable secondary battery such as a nickel-cadmium battery, a lead-acid battery, a nickel-metal hydride (NiMH) battery, a lithium ion battery, a lithium polymer battery, and the like, but is not limited to.

The information processing part 800 may output information received from the outside through the communication part 400, information stored in the storage media 500, and/or self-generated information (for example, text message information written on the information output device 1000, etc.) to the information output part 100. In this embodiment, information may include image information and/or braille information, and the image information may include still cuts of photos, cartoons and pictures, moving pictures, and a series of texts.

The information processing part 800 may select a plurality of information output cells 200 to be driven according to information to be output to the information output part 100. The information processing part 800 may generate a scheduling plan specifying a driving order for the selected plurality of information output cells. The information processing part 800 may generate a driving signal according to the scheduling plan and transmit it to the information output cell.

The information processing part 800 may determine the power supply operation mode of the information output device 1000 and generate a scheduling plan specifying a driving order of two or more braille cells that may be driven simultaneously among the plurality of cells selected by a selection part based on the power supply operation mode.

The information processing part 800 may determine an information output mode according to the type of information to be output to the information output part 100, convert information about the information output mode into braille information, and output a conversion result of the braille information. The information processing part 800 may select a first cell group corresponding to a plurality of cells to be driven as an active region and a second cell group corresponding to a plurality of cells to be driven as an inactive region for the braille conversion result of text information. The information processing part 800 may generate a scheduling plan to sequentially perform primary driving on each cell of the first cell group and sequentially perform secondary driving on each cell of the second cell group as the primary driving is completed.

The information processing part 800 described above generates the driving signal with units of information output cells 200 and transmits it to the information output cell 200, but in another embodiment, the information processing part 800 may generate the driving signal with units of information output units 300 and transmit it to the information output unit 300. To this end, the information processing part 800 may select a plurality of information output units 300 to be driven according to information to be output to the information output part 100. The information processing part 800 may generate a scheduling plan specifying a driving order for the selected plurality of information output units 300. The information processing part 800 may generate a driving signal according to the scheduling plan and transmit it to the information output unit 300.

The control part 900, which is a kind of central processing unit, may control the entire process of processing information in conjunction with the program storage part 600 when the information output device 1000 accesses the external device and receives the information request signal or generates information internally and outputting the information processing result to the information output device 1000.

In this embodiment, the control part 900 may include all types of devices capable of processing arbitrary information, such as a processor. Here, the processor may mean, for example, a data processing device built into hardware having a physically structured circuit to perform functions expressed by codes or instructions included in a program. The data processing device built into hardware as described above may be a processing device such as a microprocessor, a central processing unit (CPU), a processor core, a multiprocessor, an application-specific integrated circuit (ASIC), a field programmable gate array (FPGA), but the scope of the present disclosure is not limited thereto.

FIGS. 9 to 12 are diagrams for schematically explaining configuration of an information processing part in FIG. 6. In the following description, descriptions of portions overlapping those of FIGS. 1 to 8 will be omitted.

Figure 9:
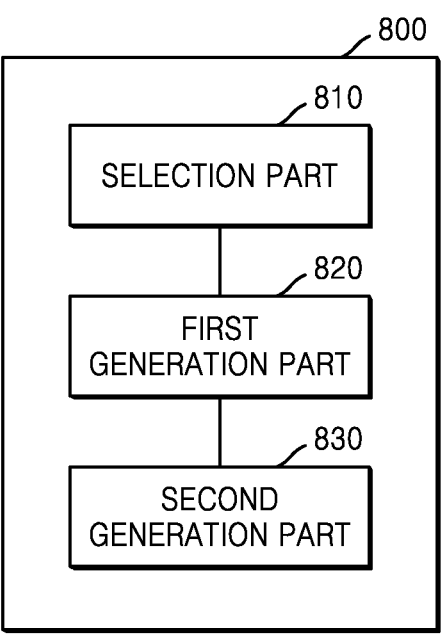
FIGS. 9 to 12 are diagrams for schematically explaining configuration of an information processing part in FIG. 6.
Figure 10:
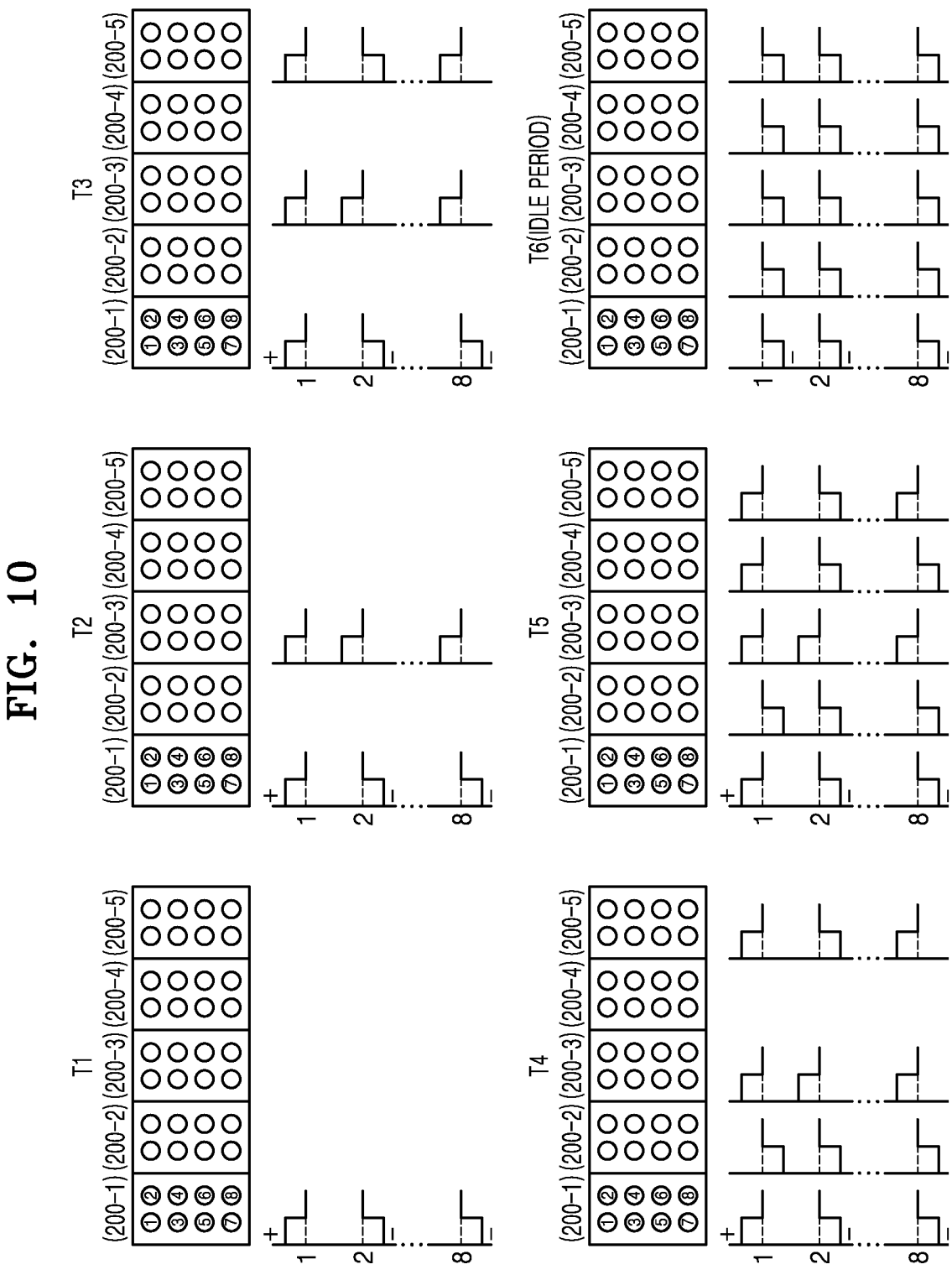

FIG. 9 is a diagram for schematically explaining a configuration of an information processing part 800 according to an embodiment, and FIG. 10 is a diagram for schematically explaining an operation of an information processing part according to an embodiment. Referring to FIGS. 9 and 10, the information processing part 800 may include a selection part 810, a first generation part 820 and a second generation part 830.

The selection part 810 may select the plurality of information output cells 200 to be driven according to information to be output to the information output part 100. The selection part 810 may select the plurality of information output cells 200 to output information received from the outside through the communication part 400, information stored in the storage media 500, and/or the self-generated information to the information output device 1000.

As an embodiment, the selection part 810 may select the first information output cell 200-1 to the fifth information output cell 200-5 as illustrated in FIG. 10 from a total of 300 information output cells 200 corresponding to 30×10 cells.

The first generation part 820 may generate the scheduling plan specifying the driving order for the plurality of information output cells 200 selected by the selection part 810.

The first generation part 820 may set a first cell group including cells spaced apart at one-cell intervals from the plurality of cells selected by the selection part 810 and a second cell group including cells excluded from the first cell group. Referring to FIG. 10, the first cell group may include the first information output cell 200-1, a third information output cell 200-3 and the fifth information output cell 200-5. From the above example, the second cell group may include the second information output cell 200-2 and a fourth information output cell 200-4.

The first generation part 820 may generate the scheduling plan to sequentially perform primary driving on each cell of the first cell group, and sequentially perform secondary driving on each cell of the second cell group as the primary driving is completed.

Referring to FIG. 10, the first generation part 820 may generate the scheduling plan to sequentially perform primary driving T1, T2 and T3 for the first information output cell 200-1, the third information output cell 200-3 and the fifth information output cell 200-5 included in the first cell group, and sequentially perform secondary driving T4 and T5 for the second information output cell 200-2 and the fourth information output cell 200-4 included in the second cell group as the primary driving for the first cell group is completed.

When the secondary driving for the second cell group is completed, the first generation part 820 may set an idle period for all information output cells 200 included in the first cell group and the second cell group and include it in the scheduling plan. Here, the idle period may be an interval time (e.g., 4 ms) for maintaining the entire information output cell 200 that has completed the primary driving and the secondary driving in that state. This idle period may be included to distinguish between a current scheduling plan and a next scheduling plan.

For example, in this embodiment, a driving period for driving each of the plurality of information output cells 200 included in the first cell group and the second cell group is 7 ms, and the idle period for stopping driving for each of the plurality of information output cells 200 included in the first cell group and the second cell group may be 4 ms.

Referring to FIG. 10, the first generation part 820 sequentially performs driving T1 to T5 of the first information output cell 200-1, the third information output cell 200-3, the fifth information output cell 200-5, the second information output cell 200-2 and the fourth information output cell 200-4 according to the scheduling plan, and then may apply the idle period T6 of 4 ms for all of the first information output cell 200-1 to the fifth information output cell 200-5 included in the scheduling plan.

In the case of the prior art, a plurality of selected information output cells 200 were driven sequentially in such a manner that an idle period of 4 ms is applied after driving a current information output cell 200 for a driving time of 7 ms, and then another idle period of 4 ms is applied after driving a next information output cell 200 for a driving time of 7 ms, instead of dividing the first cell group and the second cell group and driving them by group.

Referring to FIG. 10, in the case of the prior art, the first information output cell 200-1, the second information output cell 200-2, the third information output cell 200-3, the fourth information output cell 200-4 and the fifth information output cell 200-5 were driven sequentially for driving time of 7 ms, and the idle period of 4 ms was applied between information output cells. Accordingly, it took 11 ms (7 ms+4 mx)×5=55 ms to operate all of the first information output cell 200-1 to the fifth information output cell 200-5.

However, in the case of this embodiment, after sequentially driving the first information output cell 200-1, the third information output cell 200-3, the fifth information output cell 200-5, the second information output cell 200-2 and the fourth information output cell 200-4, the idle period of 4 ms to all of the first information output cell 200-1 to the fifth information output cell 200-5 included in the scheduling plan is applied, so that it takes (7 ms×5)+4 ms=39 ms to operate all of the first information output cell 200-1 to the fifth information output cell 200-5, thereby reducing operating time compared to the prior art. Therefore, in the case of this embodiment, the entire operating time of the information output device 1000 may be optimized.

In addition, in the case of the prior art, malfunction due to interference between the information output cells 200 occurred by sequentially driving the information output cells 200, but in this embodiment, malfunction due to interference between the information output cells 200 may be prevented by driving the information output cells 200 according to the scheduling plan.

As an optional embodiment, the first generation part 820 may generate the scheduling plan specifying the driving order for two or more information output cells 200 capable of driving simultaneously among the plurality of information output cells 200 selected by the selection part 810. Here, the number of information output cells 200 that may be simultaneously driven may vary depending on the power supplied to the information output device 1000.

As an example, one information output cell 200 requires a current of 1.6 A for driving, when the information output device 1000 is powered by the battery and the current that may be supplied to the information output part 100 at one time is about 3 A, a maximum of two information output cells 200 may be driven simultaneously. If the information output device 1000 receives power from AC power instead of the battery, the current that may be supplied at one time to the information output part 100 exceeds about 3 A, so the number of information output cells 200 that may be driven simultaneously may be increased.

Referring to FIG. 10, for example, when the information output device 1000 is powered by the battery, the first generation part 820 may generate the scheduling plan for the primary driving that sequentially drives the fifth information output cell 200-5 after simultaneously driving the first information output cell 200-1 and the third information output cell 200-3, and the secondary driving that sequentially drives the second information output cell 200-2 and the fourth information output cell 200-4 after the primary driving is completed.

The second generation part 830 may generate the driving signal according to the scheduling plan generated by the first generation part 820 and transmit it to the corresponding the information output cell 200. In this embodiment, since the one information output cell 200 includes the 8 information output units 300, so the second generation part 830 may generate and transmit 8 driving signals to the one information output cell 200. Here, the second generation part 830 may generate the driving signal including the + pulse voltage for the information output unit 300 to ascend, and the driving signal including the − pulse voltage to the information output unit 300 to descend.

Referring to FIG. 10, in the first information output cell 200-1 to the fifth information output cell 200-5, since the first information output cell 200-1, the third information output cell 200-3, the fifth information output cell 200-5, the second information output cell 200-2 and the fourth information output cell 200-4 are sequentially driven, the 8 driving signals may be sequentially transmitted to each of information output cells.

Since the driving signal generated by the second generation part 830 is transmitted to the corresponding information output cell 200, the selected information output cell 200 may be derived according to the scheduling plan. First, the primary driving for each of the information output cells 200 of the first cell group is sequentially performed, and when the primary driving for the information output cells 200 of the first cell group is completed, the secondary driving for each of the information output cells 200 of the second cell group may be sequentially performed. Next, when the secondary driving for the information output cells 200 of the second cell group is completed, the current driving state may be maintained for all of the information output cells 200 included in the first cell group and the second cell group during the idle period. Thereafter, when driving of all information output cells 200 included in the scheduling plan is completed, it may be terminated.

Here, the idle period may be an interval time (e.g., 4 ms) for maintaining the entire information output cell 200 that has completed the primary driving and the secondary driving in that state. This idle period may be included to distinguish between a current scheduling plan and a next scheduling plan.

As another embodiment, the selection part 810 may select the plurality of information output units 300 to be driven according to information to be output to the information output part 100.

The first generation part 820 may generate the scheduling plan specifying the driving order for the plurality of information output units 300 selected by the selection part 810.

The first generation part 820 may set the plurality of information output units 300 selected by the selection part 810 as a first unit group including the information output units 300 spaced apart by one information output unit 300 interval and a second unit group including the information output units 300 excluded from the first unit group.

The first generation part 820 may generate the scheduling plan to sequentially perform primary driving on each of the information output units 300 of the first unit group and sequentially perform secondary driving on each of the information output units 300 of the second unit group as the primary driving is completed.

When the secondary driving for the second unit group is completed, the first generation part 820 may set the idle period for the information output units 300 included in the first unit group and the second unit group and include it in the scheduling plan.

Also, the first generation part 820 may generate the scheduling plan specifying the driving order for two or more information output units 300 capable of driving simultaneously among the plurality of information output units 300 selected by the selection part 810.

The second generation part 830 may generate the driving signal according to the scheduling plan generated by the first generation part 820 and transmit it to the information output unit 300.

Figure 11:
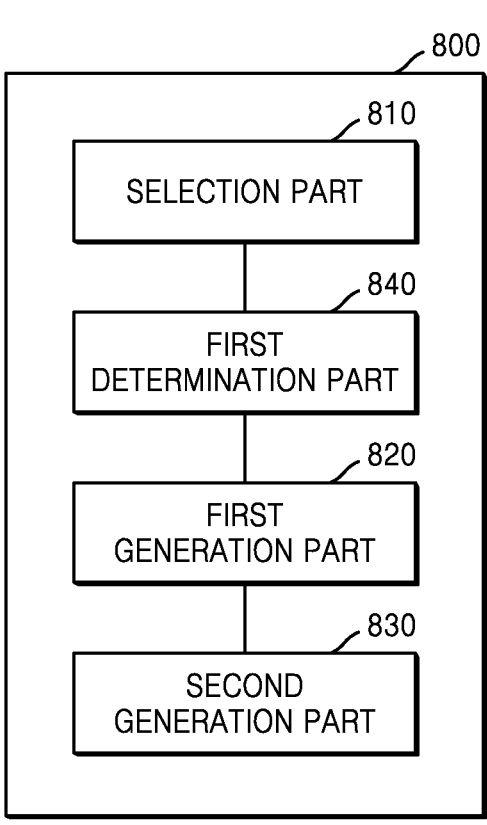

FIG. 11 is a diagram for schematically explaining a configuration of an information processing part 800 according to another embodiment. In the following description, descriptions of portions overlapping those of FIGS. 1 to 10 will be omitted. Referring to FIG. 11, the information processing part 800 may include the selection part 810, the first generation part 820, the second generation part 830 and a first determination part 840.

The selection part 810 may select the plurality of information output cells 200 to be driven according to information to be output to the information output part 100.

The first determination part 840 may determine whether it is the first power mode in which the information output device 1000 operates by AC power or the second power mode in which the information output device 1000 operates by DC power from the battery.

The first generation part 820 may generate the scheduling plan specifying the driving order for two or more information output cells 200 that may be simultaneously driven among the plurality of information output cells 200 selected by the selection part 810 based on the determination result of the first determination part 840.

In this embodiment, the number of information output cells 200 that may be simultaneously driven in the first power mode may be greater than that in the second power mode. In the above example, in the case of the second power mode, the number of information output cells 200 that may be driven simultaneously may be two, and in the case of the first power mode, the number of information output cells 200 that may be driven simultaneously may exceed two. Therefore, the scheduling plan generated by the first generation part 820 may vary according to the first power mode or the second power mode.

Hereinafter, descriptions of the selection part 810, the first generation part 820 and the second generation part 830 are the same as those of FIGS. 9 and 10, so they will be omitted.

Figure 12:
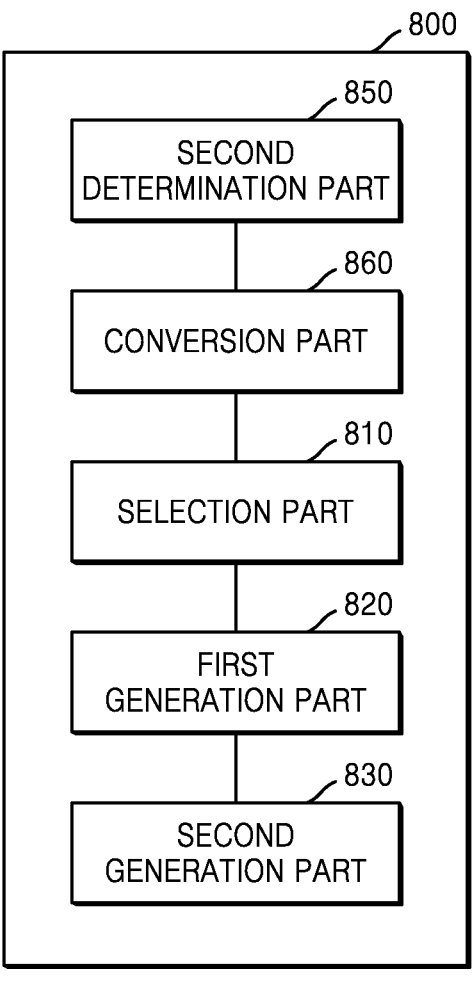

FIG. 12 is a diagram for schematically explaining a configuration of an information processing part 800 according to another embodiment. In the following description, descriptions of portions overlapping with those of FIGS. 1 to 11 will be omitted. Referring to FIG. 12, the information processing part 800 may include the selection part 810, the first generation part 820, the second generation part 830, a second determination part 850 and a conversion part 860.

The second determination part 850 may determine the information output mode according to the type of information to be output to the information output part 100. The second determination part 850 may determine one of a first information output mode in which the type of information to be output to the information output part 100 is image information, a second information output mode in which the type of information to be output to the information output part 100 is text information, and a third information output mode in which the type of information to be output to the information output part 100 is a mixture of image information and text information.

The conversion part 860 may convert information on the information output mode into braille information, and output a conversion result of the braille information to the selection part 810.

As an example, the conversion part 860 stores a braille table and stores braille for Braille method consisting of Korean consonants (giyeok, nieun, digeut, . . . , hieut), Korean vowels (a, ya, eo, . . . , we), Korean fortis (kk, tt, pp, ss, jj), abbreviations (ga, sa, . . . , but, therefore, accordingly), numbers (1, 2, 3, . . . , 0), signs (?, !, +, . . . ) or English alphabets (A, B, C, . . . , Z), etc. Accordingly, when the text information is received, the conversion part 860 may convert the text information into the braille information based on the braille table.

The selection part 810 may select a first cell group corresponding to the plurality of information output cells 200 to be driven into the active region and a second cell group corresponding to the plurality of information output cells 200 to be driven into the inactive region for the braille conversion result of the image information included in the first information output mode and the third information output mode.

Here, the active region may include designating a rising position of the information output unit 300 with respect to a foreground region among the braille conversion results of image information. In addition, the inactive region may include designating a descending position of the information output unit 300 for the foreground region among the braille conversion results of image information.

In addition, the selection part 810 may select the first cell group corresponding to the plurality of information output cells 200 to be driven into the active region and the second cell group corresponding to the plurality of information output cells 200 to be driven into the inactive region for the braille conversion result of the text information included in the second information output mode and the third information output mode.

Here, the active region may include specifying the rising position and/or descending position of the information output unit 300 among the braille conversion results of text information. In addition, the inactive region may include designating descending positions for the information output unit 300 between braille characters, between rows of braille characters and between paragraphs of braille characters, in the active region.

The first generation part 820 may generate the scheduling plan to sequentially perform the primary driving on each cell of the first cell group, and sequentially perform the secondary driving on each cell of the second cell group as the primary driving is completed.

In this embodiment, the first generation part 820 may generate the scheduling plan to sequentially perform the primary driving on each of the information output cells 200 of the first cell group corresponding to the active region (foreground region), and sequentially perform the secondary driving on each of the information output cells 200 of the second cell group corresponding to the inactive region (background region) as the primary driving is completed, regarding the scheduling plan of the image information.

In this embodiment, the first generation part 820 may generate the scheduling plan to sequentially perform the primary driving on each of the information output cells 200 of the first cell group corresponding to the active region (braille conversion result of text information), and sequentially perform the secondary driving on each of the information output cells 200 of the second cell group corresponding to the inactive region (between braille characters, between rows of braille characters and between paragraphs of braille characters) as the primary driving is completed, regarding the scheduling plan of the text information.

Hereinafter, descriptions of the first generation part 820 and the second generation part 830 will be omitted since they are identical to those of FIGS. 9 to 11.

Figure 13:
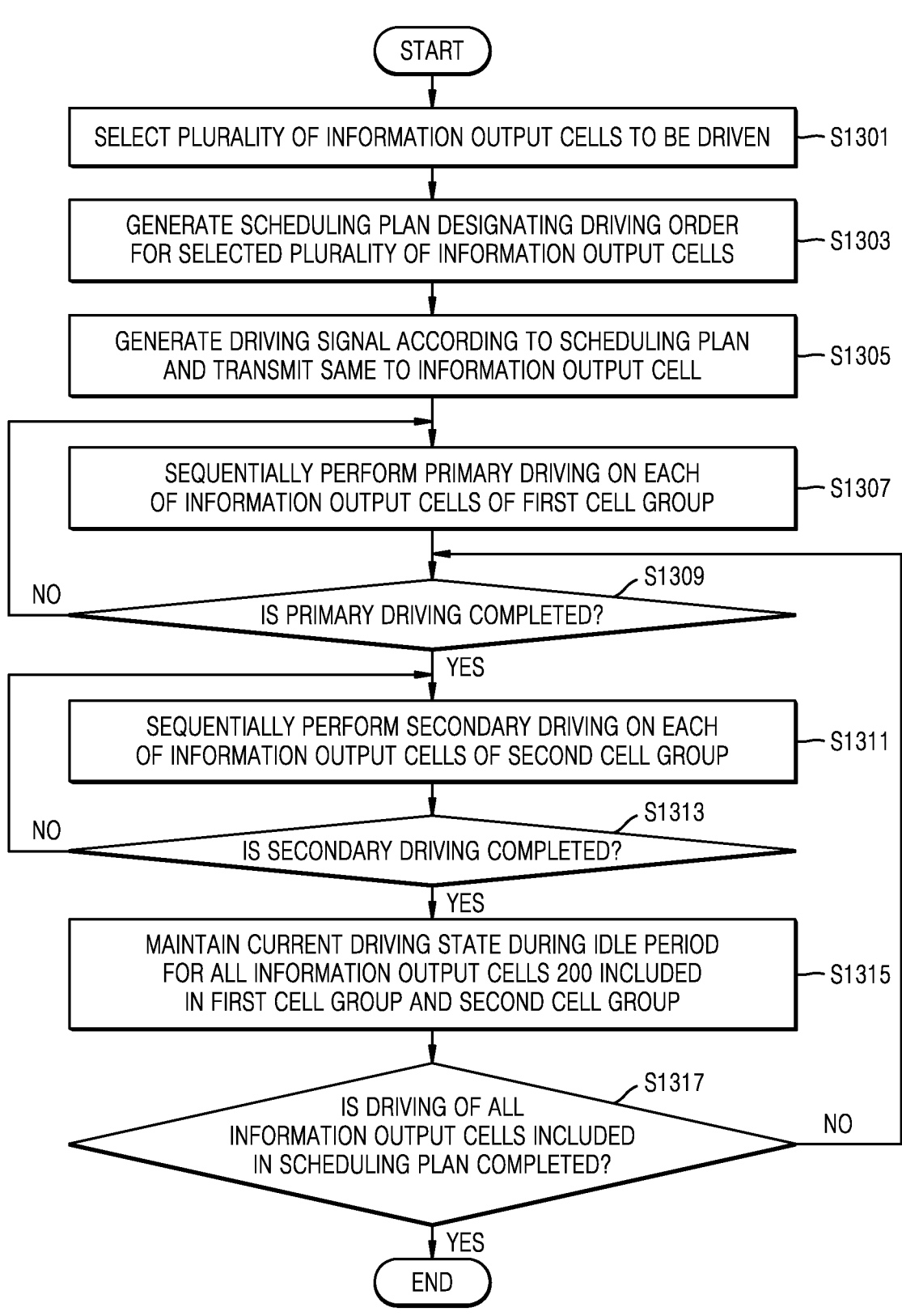
FIGS. 13 to 15 are flowcharts for explaining an information output method according to the present embodiment.

FIG. 13 is a flowchart for explaining an information output method according to an embodiment of present disclosure. In the following description, descriptions of overlapping parts with those of FIGS. 1 to 12 will be omitted.

Referring to FIG. 13, in step S1301, the information output device 1000 selects the plurality of information output cells 200 to be driven according to information to be output to the information output part 100 in which the information output cells 200 containing a predetermined number of information output unit 300 formed to be tactilely sensed when upward movement or downward movement occurs in at least one direction are arranged in the lattice structure.

In step S1303, the information output device 1000 generates the scheduling plan designating the driving order for the selected plurality of information output cells 200. Here, the scheduling plan may include the plan to set the plurality of selected information output cells 200 as the first cell group including the information output cells 200 spaced apart by one information output cell 200 interval and the second cell group including the information output cells 200 excluded from the first cell group, to sequentially perform the primary driving on each of the information output cells 200 of the first cell group, and to sequentially perform the secondary driving on each of the information output cells 200 of the second cell group as the primary driving is completed. In addition, as secondary driving is completed, the idle period for the information output cells 200 included in the first cell group and the second cell group may be set and included in the scheduling plan.

In step S1305, the information output device 1000 generates the driving signal according to the scheduling plan and transmits it to the information output cell 200.

In step S1307, the information output device 1000 sequentially perform the primary driving on each of the information output cells 200 of the first cell group. The information output device 1000 may perform the primary driving by simultaneously transmitting the 8 driving signals consisting of + pulse voltage and/or − pulse voltage to each of the information output cells 200 of the first cell group.

In step S1309, the information output device 1000 determines whether the primary driving for the information output cell 200 of the first cell group is completed.

In step S1311, when the primary driving of the information output cells 200 of the first cell group is completed, the information output device 1000 sequentially performs the secondary driving on each of the information output cells 200 of the second cell group. The information output device 1000 may perform the secondary driving by simultaneously transmitting the 8 driving signals consisting of + pulse voltage and/or − pulse voltage to each of the information output cells 200 of the second cell group.

In step S1313, the information output device 1000 determines whether the secondary driving for the information output cell 200 of the second cell group is completed.

In step S1315, when the secondary driving of the information output cell 200 of the second cell group is completed, the information output device 1000 maintains the current driving state during the idle period for all information output cells 200 included in the first cell group and the second cell group.

In step S1317, the information output device 1000 terminates when driving of all information output cells 200 included in the scheduling plan is completed.

Figure 14:
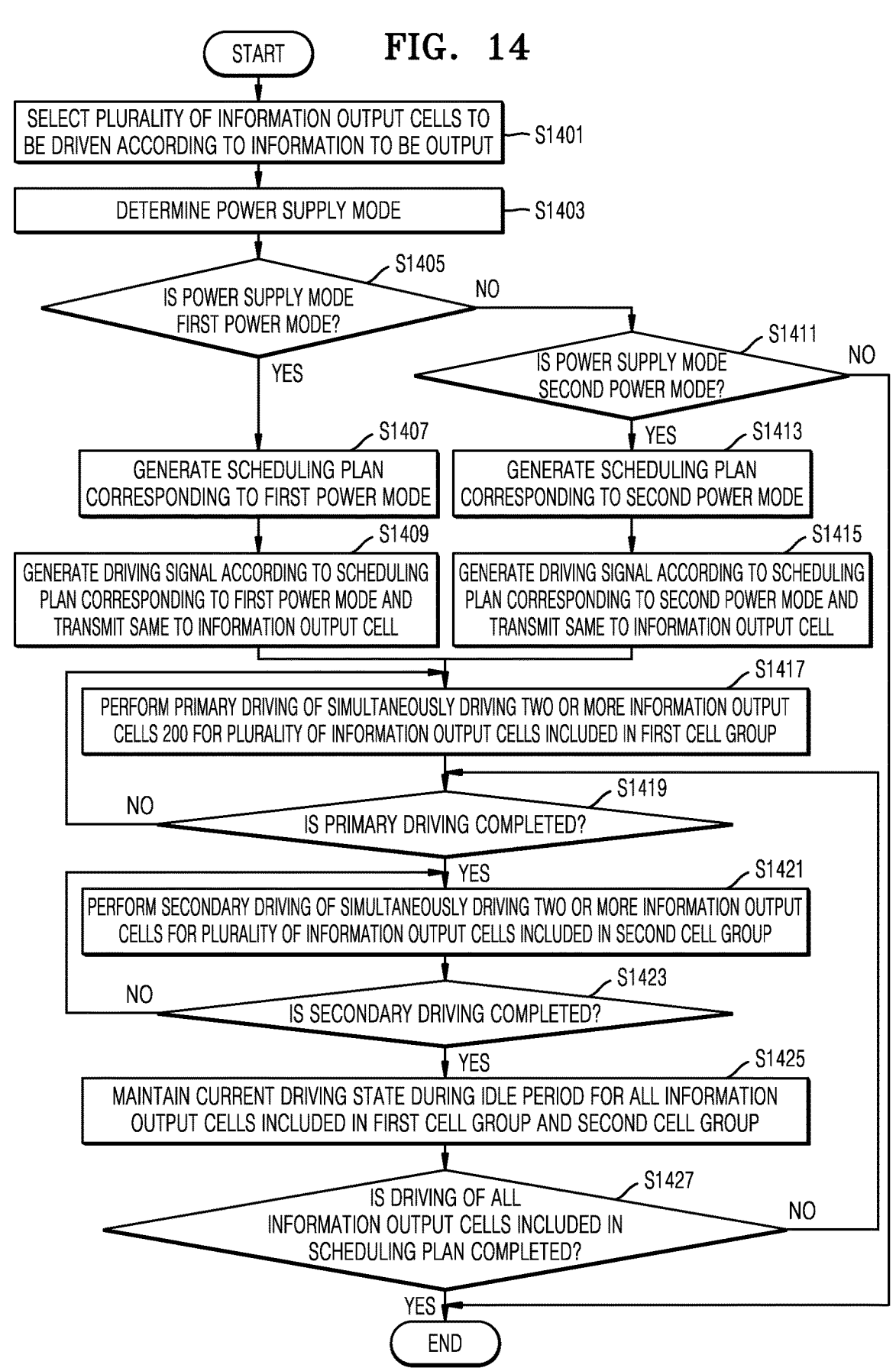

FIG. 14 is a flowchart for explaining an information output method according to another embodiment of present disclosure. In the following description, descriptions of portions overlapping those of FIGS. 1 to 13 will be omitted.

Referring to FIG. 14, in step S1401, the information output device 1000 selects the plurality of information output cells 200 to be driven according to information to be output to the information output part 100.

In step S1403, the information output device 1000 determines a power supply mode.

In step S1405, the information output device 1000 determines whether the power supply mode is the first power mode operated by AC power.

In step S1407, the information output device 1000 generates the scheduling plan corresponding to the first power mode. Here, the scheduling plan corresponding to the first power mode may further include the plan for designating the driving order for the two or more information output cells 200 that may be simultaneously driven in the scheduling plan of FIG. 13. Compared to the second power mode, the first power mode may have a larger number of information output cells 200 that may be simultaneously driven.

In step S1409, the information output device 1000 generates the driving signal according to the scheduling plan corresponding to the first power mode and transmits it to the information output cell 200.

In step S14011, the information output device 1000 determines whether the power supply mode is the second power mode operated by DC power from the battery.

In step S1413, the information output device 1000 generates the scheduling plan corresponding to the second power mode. Here, the scheduling plan corresponding to the second power mode may further include the plan for specifying the driving order for the two or more information output cells 200 that may be simultaneously driven in the scheduling plan of FIG. 13. Compared to the first power mode, the second power mode may have a smaller number of information output cells 200 that may be simultaneously driven.

In step S1415, the information output device 1000 generates the driving signal according to the scheduling plan corresponding to the second power mode and transmits it to the information output cell 200.

In step S1417, the information output device 1000 performs the primary driving of simultaneously driving the two or more information output cells 200 for the plurality of information output cells 200 included in the first cell group.

In step S1419, the information output device 1000 determines whether the primary driving for the information output cells 200 of the first cell group is completed.

In step S1421, the information output device 1000 performs the secondary driving of simultaneously driving the two or more information output cells 200 for the plurality of information output cells 200 included in the second cell group when the primary driving for the information output cells 200 of the first cell group is completed.

In step S1423, the information output device 1000 determines whether the secondary driving for the information output cell 200 of the second cell group is completed.

In step S1425, when the secondary driving for the information output cell 200 of the second cell group is completed, the information output device 1000 maintains the current driving state during the idle period for all information output cells 200 included in the first cell group and the second cell group.

In step S1427, the information output device 1000 is terminated when driving of all information output cells 200 included in the scheduling plan is completed.

Figure 15:
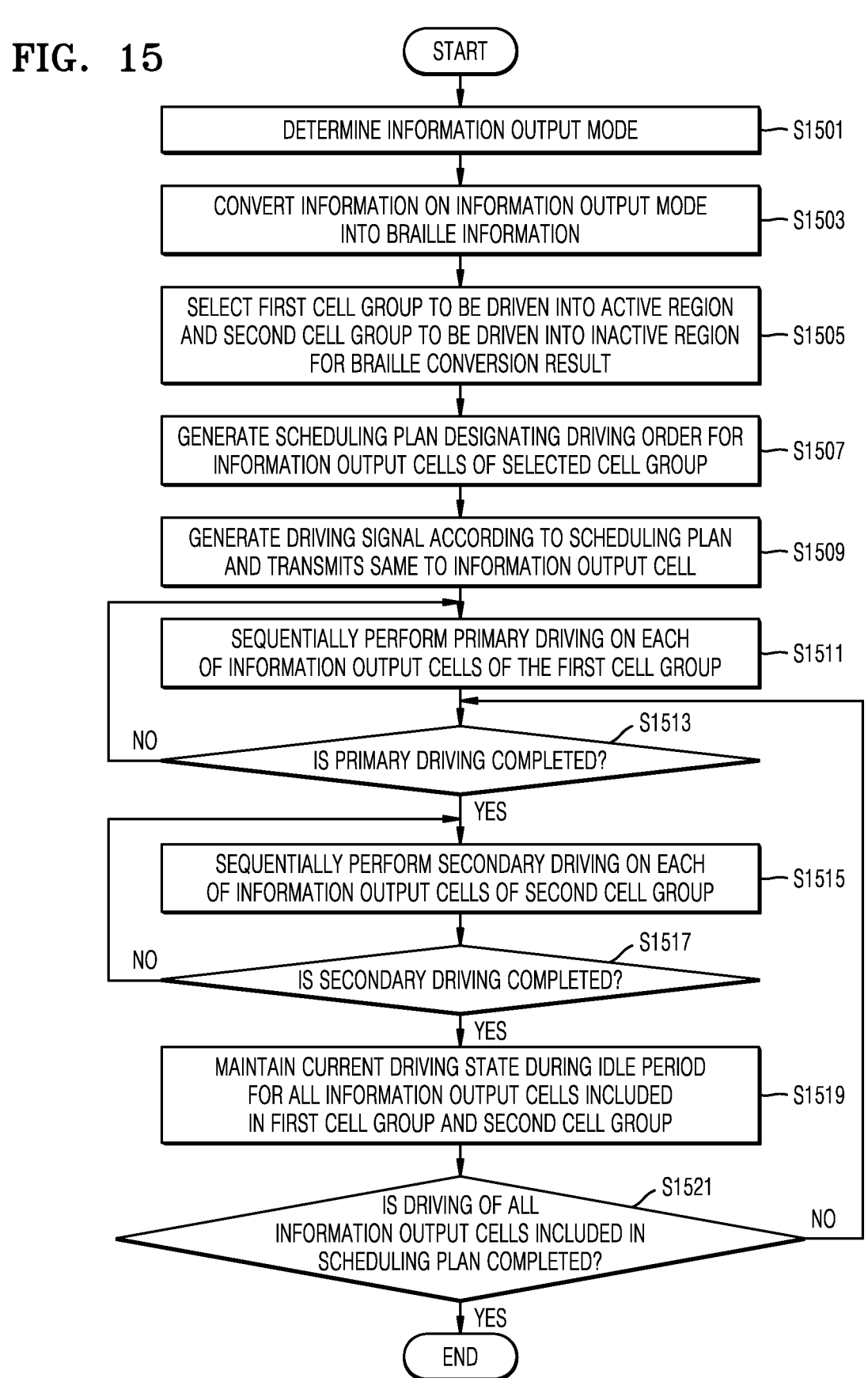

FIG. 15 is a flowchart for explaining an information output method according to another embodiment of present disclosure. In the following description, descriptions of overlapping portions with those of FIGS. 1 to 14 will be omitted.

Referring to FIG. 15, in step S1501, the information output device 1000 determines the information output mode according to the type of information to be output to the information output part 100. The information output device 1000 may determine one of the first information output mode in which the type of information to be output to the information output part 100 is the image information, the second information output mode in which the type of information to be output to the information output part 100 is the text information, and the third information output mode in which the type of information to be output to the information output part 100 is the mixture of image information and text information.

In step S1503, the information output device 1000 converts the information on the information output mode into the braille information.

In step S1505, the information output device 1000 selects the first cell group corresponding to the plurality of information output cells 200 to be driven into the active region and the second cell group corresponding to the plurality of information output cells 200 to be driven into the inactive region for the braille conversion result.

The information output device 1000 may select the first cell group corresponding to the plurality of information output cells 200 to be driven into the active region and the second cell group corresponding to the plurality of information output cells 200 to be driven into the inactive region for the braille conversion result of the image information included in the first information output mode and the third information output mode. Here, the active region may include designating the rising position of the information output unit 300 with respect to the foreground region among the braille conversion results of image information. In addition, the inactive region may include designating the descending position of the information output unit 300 for the foreground region among the braille conversion results of image information.

The information output device 1000 may select the first cell group corresponding to the plurality of information output cells 200 to be driven into the active region and the second cell group corresponding to the plurality of information output cells 200 to be driven into the inactive region for the braille conversion result of the text information included in the second information output mode and the third information output mode. Here, the active region may include specifying the rising position and/or the descending position of the information output unit 300 among the braille conversion results of text information. In addition, the inactive region may include designating the descending positions for the information output unit 300 between braille characters, between rows of braille characters and between paragraphs of braille characters, in the active region.

In step S1507, the information output device 1000 generates the scheduling plan designating the driving order for the information output cells 200 of the selected cell group. Here, the scheduling plan may include the plan to sequentially perform the primary driving on each of the information output cells 200 of the first cell group corresponding to the plurality of information output cells 200 to be driven to the active region, and to sequentially perform the secondary driving on each of the information output cells 200 of the second cell group corresponding to the plurality of information output cells 200 to be driven to the inactive region as the primary driving is completed.

In step S1509, the information output device 1000 generates the driving signal according to the scheduling plan and transmits it to the information output cell 200.

In step S1511, the information output device 1000 sequentially performs the primary driving on each of the information output cells 200 of the first cell group.

In step S1513, the information output device 1000 determines whether the primary driving on the information output cells 200 of the first cell group is completed.

In step S1515, when the primary driving on the information output cells 200 of the first cell group is completed, the information output device 1000 sequentially performs the secondary driving on each of the information output cells 200 of the second cell group.

In step S1517, the information output device 1000 determines whether the secondary driving on the information output cells 200 of the second cell group is completed.

In step S1519, when the secondary driving on the information output cells 200 of the second cell group is completed, the information output device 1000 maintains the current driving state during the idle period for all information output cells 200 included in the first cell group and the second cell group.

In step S1521, the information output device 1000 is terminated when driving of all information output cells 200 included in the scheduling plan is completed.

Figure 16:
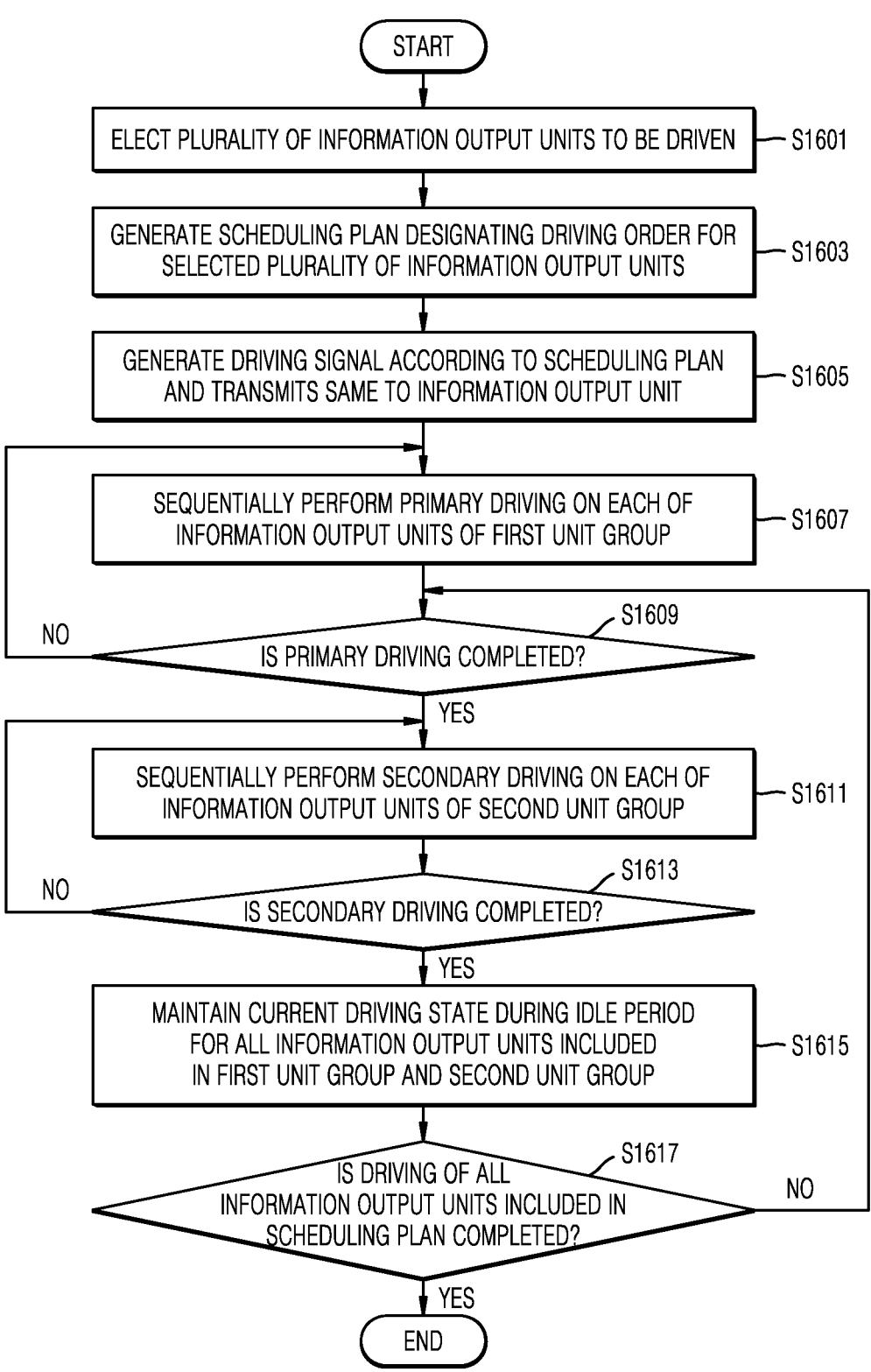
FIG. 16 is a flowchart for explaining an information output method according to an embodiment of present disclosure.

FIG. 16 is a flowchart for explaining an information output method according to an embodiment of present disclosure. In the following description, descriptions of overlapping portions with those of FIGS. 1 to 15 will be omitted.

Referring to FIG. 16, in step S1601, the information output device 1000 selects the plurality of information output units 300 to be driven according to the information to be output to the information output part 100 among the information output units 300 formed to be tactilely sensed when upward movement or downward movement occurs in at least one direction.

In step S1603, the information output device 1000 generates the scheduling plan designating the driving order for the selected plurality of information output units 300. Here, the scheduling plan may include the plan to set the plurality of information output units 300 as the first unit group including the information output units 300 spaced apart by one information output unit 300 interval and the second unit group including the information output units 300 excluded from the first unit group, to sequentially perform the primary driving on each of the information output units 300 of the first unit group, and to sequentially perform the secondary driving on each of the information output units 300 of the second unit group as the primary driving is completed. In addition, as the secondary driving is completed, the idle period for the information output units 300 included in the first unit group and the second unit group may be set and included in the scheduling plan.

In step S1605, the information output device 1000 generates the driving signal according to the scheduling plan and transmits it to the information output unit 300.

In step S1607, the information output device 1000 sequentially performs the primary driving on each of the information output units 300 of the first unit group. The information output device 1000 may perform the primary driving by simultaneously transmitting 8 driving signals consisting of + pulse voltage or − pulse voltage to each of the information output units 300 of the first unit group.

In step S1609, the information output device 1000 determines whether the primary driving on the information output unit 300 of the first unit group is completed.

In step S1611, when the primary driving on the information output unit 300 of the first unit group is completed, the information output device 1000 sequentially performs the secondary driving on each of the information output units 300 of the second unit group. The information output device 1000 may perform the secondary driving by simultaneously transmitting 8 driving signals consisting of + pulse voltage or − pulse voltage to each of the information output units 300 of the second unit group.

In step S1613, the information output device 1000 determines whether the secondary driving on the information output units 300 of the second unit group is completed.

In step S1615, when the secondary driving on the information output units 300 of the second unit group is completed, the information output device 1000 maintains the current driving state during the idle period for all information output units 300 included in the first unit group and the second unit group.

In step S1617, the information output device 1000 terminates when driving of all information output units 300 included in the scheduling plan is completed.

Embodiments according to the above-described present disclosure may be implemented in the form of a computer program that may be executed on a computer through various components, and such a computer program may be recorded on a computer-readable medium. At this time, the medium is a magnetic medium such as a hard disk, a floppy disk and a magnetic tape, an optical recording medium such as a CD-ROM and a DVD, a magneto-optical medium such as a floptical disk, and a ROM, RAM, flash memory, etc., may include hardware devices specially configured to store and execute program instructions.

Meanwhile, the computer program may be specially designed and configured for present disclosure, or may be known and usable to those skilled in the art of computer control software. An example of a computer program may include not only machine language code generated by a compiler but also high-level language code that can be executed by a computer using an interpreter or the like.

In the specification of the present disclosure (particularly in the claims), the use of the term "the" and similar indicating terms may correspond to both singular and plural. In addition, when a range is described in the present disclosure, the disclosure to which individual values belonging to the range are applied is included, and if there is no description to the contrary, it is as if each individual value constituting the range is described in the detailed description of the disclosure.

If there is no clear or contrary description of the order of the steps constituting the method according to the present disclosure, the steps may be performed in a suitable order. The present disclosure is not necessarily limited according to the order of description of the steps. All examples or exemplary terms (e.g., etc.) in the present disclosure are simply for explaining the present disclosure in detail, so the scope of the present disclosure is not limited by the examples or exemplary terms unless it is limited by the claims. In addition, those skilled in the art can appreciate that various modifications, combinations and changes can be made according to design conditions and factors within the scope of the appended claims or equivalents thereof.

Therefore, the spirit of the present disclosure is not limited to the above-described embodiments, and not only the claims to be described later, but also all ranges equivalent to or equivalently changed to the claims belong to the scope of the spirit of the present disclosure.

The invention claimed is:

1. An information output device comprising:
an information output part in which cells, including a predetermined number of information output units configured to be tactilely sensed when upward movement or downward movement occurs in at least one direction, are arranged in a lattice structure;
a selection processor configured to select a plurality of cells to be driven according to information to be output to the information output part;
a first generation processor configured to generate a scheduling plan specifying a driving order for the plurality of cells selected by the selection processor; and
a second generation processor configured to generate a driving signal according to the scheduling plan and transmitting the driving signal to the cells.

2. The information output device of claim 1, wherein the first generation processor
sets, from among the plurality of cells selected by the selection processor, a first cell group including cells spaced apart at one-cell intervals and a second cell group including cells excluded from the first cell group, and
generates the scheduling plan to sequentially perform primary driving on each cell of the first cell group and sequentially perform secondary driving on each cell of the second cell group as the primary driving is completed.

3. The information output device of claim 2, wherein the first generation processor sets idle periods for cells included in the first cell group and the second cell group as the secondary driving is completed and includes the idle periods in the scheduling plan.

4. The information output device of claim 1,
wherein the first generation processor generates a scheduling plan specifying a driving order for two or more cells that are driven simultaneously among the plurality of cells selected by the selection processor.

5. The information output device of claim 1, further comprising
a first determination processor configured to determine whether the information output device is in a first power mode operated by alternating current power or a second power mode operated by direct current power from a battery,
wherein the first generation processor
generates a scheduling plan based on the first power mode or the second power mode.

6. The information output device of claim 1, further comprising
a second determination processor configured to determine an information output mode according to type of information to be output to the information output part; and
a conversion processor configured to convert the information into braille information and output a result of the conversion to the selection processor.

7. The information output device of claim 6, wherein the second determination processor determines one of a first information output mode in which the type of information is image information, a second information output mode in which the type of information is text information, and a third information output mode in which the type of information is a mixture of image information and text information.

8. The information output device of claim 7, wherein the selection processor selects a first cell group corresponding to an active region and a second cell group corresponding to an inactive region, and
the first generation processor generates the scheduling plan to sequentially perform primary driving on each cell of the first cell group and secondary driving on each cell of the second cell group.

9. An information output device comprising:
an information output part in which information output units, configured to be tactilely sensed when upward movement or downward movement occurs in at least one direction, are arranged;
a selection processor configured to select a plurality of information output units to be driven according to information to be output to the information output part;
a first generation processor configured to generate a scheduling plan specifying a driving order for the plurality of information output units selected by the selection processor; and
a second generation processor configured to generate a driving signal according to the scheduling plan and transmitting the driving signal to the information output unit.

10. The information output device of claim 9, wherein the first generation processor
sets the plurality of units selected by the selection processor as a first unit group including information output units spaced apart at one-information-output-unit intervals and a second unit group including units excluded from the first unit group, and
generates the scheduling plan to sequentially perform primary driving on each information output unit of the first unit group and sequentially perform secondary driving on each information output unit of the second unit group as the primary driving is completed.

11. An information output method comprising:
selecting a plurality of cells to be driven according to information to be output to an information output part in which cells including a predetermined number of information output units configured to be tactilely sensed when upward movement or downward movement occurs in at least one direction are arranged in a lattice structure, by a selection processor;
generating a scheduling plan specifying a driving order for the plurality of cells selected by the selection processor, by a first generation processor; and
generating a driving signal according to the scheduling plan and transmitting the driving signal to the cell, by a second generation processor.

12. The information output method of claim 11,
wherein the generating the scheduling plan comprises:
setting, by the first generation processor, from among the plurality of cells selected by the selection processor, a first cell group including cells spaced apart at one-cell intervals and a second cell group including cells excluded from the first cell group; and
generating, by the first generation processor, the scheduling plan to sequentially perform primary driving on each cell of the first cell group and sequentially perform secondary driving on each cell of the second cell group as the primary driving is completed.

13. The information output method of claim 12, further comprising
setting, by the first generation processor, idle periods for cells included in the first cell group and the second cell group as the secondary driving is completed and including the idle periods in the scheduling plan.

14. The information output method of claim 11,
wherein generating the scheduling plan by the first generation processor, comprises
generating a scheduling plan specifying a driving order for two or more cells that are driven simultaneously among the plurality of cells selected by the selection processor.

15. The information output method of claim 11, further comprising
determining whether the information output method is in a first power mode operated by alternating current power or a second power mode operated by direct current power from a battery, by a first determination processor; and
generating a scheduling plan based on the first power mode or the second power mode, by the first generation processor.

16. The information output method of claim 11, further comprising
determining an information output mode according to type of information to be output to the information output part, by a second determination processor; and
converting the information on the information output mode into braille information and outputs a result of conversion to the selection processor, by a conversion processor.

17. The information output method of claim 16, wherein the determining the information output mode by the second determination processor, comprises determining one of a first information output mode in which the type of information is image information, a second information output mode in which the type of information is text information, and a third information output mode in which the type of information is a mixture of image information and text information.

18. The information output method of claim 17, further comprising selecting a first cell group corresponding to an active region and a second cell group corresponding to an inactive region, by the selection processor; and generating the scheduling plan to sequentially perform primary driving on each cell of the first cell group and secondary driving on each cell of the second cell group, by the first generation processor.

\* \* \* \* \*